(12) United States Patent
Troutner et al.

(10) Patent No.: US 10,173,120 B2
(45) Date of Patent: Jan. 8, 2019

(54) GOLF BALL SELECTION USING MOBILE COMPUTER DEVICE WITH CAMERA

(71) Applicant: BRIDGESTONE SPORTS CO., LTD., Tokyo (JP)

(72) Inventors: Andrew Troutner, Covington, GA (US); Adam Rehberg, Covington, GA (US)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 228 days.

(21) Appl. No.: 15/188,158

(22) Filed: Jun. 21, 2016

(65) Prior Publication Data

US 2016/0375302 A1  Dec. 29, 2016

Related U.S. Application Data

(60) Provisional application No. 62/185,042, filed on Jun. 26, 2015.

(51) Int. Cl.

| | |
|---|---|
| *A63B 69/36* | (2006.01) |
| *A63B 24/00* | (2006.01) |
| *A63B 57/00* | (2015.01) |
| *G06K 9/00* | (2006.01) |
| *G09B 19/00* | (2006.01) |

(Continued)

(52) U.S. Cl.
CPC .......... *A63B 69/36* (2013.01); *A63B 24/0003* (2013.01); *A63B 57/00* (2013.01); *G06F 3/0488* (2013.01); *G06K 9/00342* (2013.01); *G09B 19/0038* (2013.01); *A63B 2069/3605* (2013.01); *A63B 2071/063* (2013.01)

(58) Field of Classification Search
None
See application file for complete search history.

(56) References Cited

U.S. PATENT DOCUMENTS

| | | | | |
|---|---|---|---|---|
| 2004/0006442 | A1* | 1/2004 | Boehm | A63B 69/36 702/145 |
| 2011/0009215 | A1* | 1/2011 | Ichikawa | A63B 69/3655 473/409 |

(Continued)

*Primary Examiner* — Jason Yen
(74) *Attorney, Agent, or Firm* — Sughrue Mion, PLLC

(57) ABSTRACT

There is provided is a method and computer program product for selecting an appropriate golf ball for a subject by using a mobile computer device with a camera. The method includes: inputting information concerning hitting skill of the subject to the mobile computer device; performing a calibration of a distance and/or direction between two points in a screen of the mobile computer for shooting a moving image; shooting a moving image by the camera of the mobile computer device when the subject hits a golf ball by a golf club; determining a head speed of the golf club before an impact of the club and the ball from the shot moving image based on the calibration; computing a golf ball product having a suitable performance for the subject from the input information concerning hitting skill and the determined head speed, based on a database comprising data of information concerning hitting skills of players, data of head speeds before impact of club and ball, and data of performances of golf ball products which are correlated with each other; and displaying the computed recommended golf ball product on the mobile computer device.

50 Claims, 33 Drawing Sheets

(51) Int. Cl.
    *G06F 3/0488*     (2013.01)
    *A63B 71/06*     (2006.01)

(56) References Cited

U.S. PATENT DOCUMENTS

| | | | |
|---|---|---|---|
| 2012/0016599 A1* | 1/2012 | Ishii | A63B 24/0021 |
| | | | 702/33 |
| 2013/0116808 A1* | 5/2013 | Molinari | A63B 69/36 |
| | | | 700/91 |
| 2013/0137528 A1* | 5/2013 | Ishii | A63B 69/36 |
| | | | 473/221 |
| 2013/0213153 A1* | 8/2013 | Ishii | G01N 33/00 |
| | | | 73/865.8 |
| 2014/0260637 A1* | 9/2014 | Molinari | G01P 9/00 |
| | | | 73/646 |
| 2014/0300733 A1 | 10/2014 | Mitchell | |
| 2014/0300745 A1 | 10/2014 | Kirk et al. | |
| 2014/0316542 A1* | 10/2014 | Beno | H04M 1/72522 |
| | | | 700/91 |
| 2015/0065271 A1* | 3/2015 | Peterson | A63B 24/0075 |
| | | | 473/406 |

\* cited by examiner

GOLF BALL SELECTION USING MOBILE COMPUTER DEVICE WITH CAMERA

CROSS-REFERENCE TO RELATED APPLICATIONS

This application claims the benefit of U.S. Provisional Patent Application No. 62/185,042 filed Jun. 26, 2015, the disclosure of which is incorporated herein by reference in its entirety.

BACKGROUND OF THE INVENTION

The present invention relates to selecting an appropriate golf ball using a mobile computer device with a camera, and more particularly, relates to a method for selecting an appropriate golf ball using a mobile computer device with a camera, and relates to a computer program product therefor.

US 2014/0300733 A1 discloses a process for determining the speed of a moving sport ball using a mobile device having a camera. The process includes video shooting of the moving sport ball in a sport court using the camera of the mobile device, and extracting from the video the data necessary for computing the speed of the moving sport ball, the data including the positions of the moving sport ball in a plurality of frames of the video relative to a plurality of predetermined reference points located on the sport court, the actual distance between the predetermined reference points on the sport court being known.

US 2014/0300745 A1 discloses a method for determining properties of a trajectory of a ball with a mobile computer device. The method includes capturing a sequence of video frames of the ball with a camera of the mobile computer device, and computing the property of the trajectory of the ball based on the first picture coordinate of the ball in the first video frame of the sequence, the second picture coordinate of the ball in the second video frame of the sequence, a time difference between the first and second video frames, and a reference quantity such as a form and/or dimension of the ball in a picture taken with the camera.

SUMMARY OF THE INVENTION

The patent documents mentioned above disclose a method for determining the speed or trajectory of the moving ball by using the mobile computer device with the camera, but fail to disclose a method for providing information more useful for a user of the mobile computer device than the determined numerical values such as speed and trajectory properties from the shot video.

An object of the present invention is to provide a method of selecting an appropriate golf ball for a golfer by shooting a moving image by a camera of a mobile computer device when the golfer hits a golf ball, and a computer program product therefor.

According to the first aspect of the present invention, there is provided a method for selecting an appropriate golf ball for a subject by using a mobile computer device with a camera, the method including:

inputting information concerning hitting skill of the subject to the mobile computer device;

performing a calibration of a distance and/or direction between two points in a screen of the mobile computer for shooting a moving image;

shooting a moving image by the camera of the mobile computer device when the subject hits a golf ball by a golf club;

determining a head speed of the golf club before an impact of the club and the ball from the shot moving image based on the calibration;

computing a golf ball product having a suitable performance for the subject from the input information concerning hitting skill and the determined head speed, based on a database comprising data of information concerning hitting skills of players, data of head speeds before impact of club and ball, and data of performances of golf ball products which are correlated with each other; and displaying the computed recommended golf ball product on the mobile computer device.

The method may further include displaying the determined head speed on the mobile computer device.

The method may further include computing an initial velocity of the golf ball hit by the subject from the input information concerning hitting skill and the determined head speed based on the database, the database further including data of initial velocities of hit golf balls which are correlated with the other data; and displaying the computed initial velocity on the mobile computer device.

The method may further including computing a launch angle of the golf ball hit by the subject from the input information concerning hitting skill and the determined head speed based on the database, the database further including data of launch angles of hit golf balls which are correlated with the other data; and displaying the computed launch angle on the mobile computer device.

The method may further include computing a carry distance of the hit golf ball from the input information concerning hitting skill and the determined head speed based on the database, the database further including data of carry distances of hit golf ball which are correlated with the other data; and displaying the computed carry distance on the mobile computer device.

The method may further include computing a total distance of the hit golf ball from the input information concerning hitting skill and the determined head speed based on the database, the database further including data of total distances of hit golf ball which are correlated with the other data; and displaying the computed total distance on the mobile computer device.

In the method, the information concerning hitting skill may include an average score or average driver distance. In addition or alternatively, the information concerning hitting skill may include a normal shot shape selected from the group consisting of hook, draw, baby draw, straight, baby fade, fade, and slice. In addition or alternatively, the information concerning hitting skill may include a normal shot height selected from the group consisting of low, medium, and high.

In the method, the two points in the shot moving image for the calibration may be opposite ends of a sleeve box for golf balls in the shot moving image along a longitudinal direction thereof.

According to the second aspect of the present invention, there is provided a nonvolatile computer program product for selecting an appropriate golf ball for a subject, the computer program product being configured to be stored in a mobile computer device with a camera and having computer program instructions to be executed by the mobile computer device, the instructions including:

determining a head speed of a golf ball hit by the subject from a moving image shot by the camera of the mobile computer device when the subject hits the golf ball, based on a calibration of a distance and/or direction between two points in a screen of the mobile computer device for shooting the moving image;

computing a golf ball product having a suitable performance for the subject from information concerning hitting skill of the subject input to the mobile computer device, and the determined head speed, based on a database including data of information concerning hitting skills of players, data of head speeds of hit golf balls, and data of performances of golf ball products which are correlated with each other; and displaying the computed recommended golf ball product on the mobile computer device.

In the computer program product, the instructions may further include displaying the determined head speed of the golf ball on the mobile computer device.

The instructions may further include computing an initial velocity of the hit golf ball from the input information concerning hitting skill and the determined head speed, based on the database, the database further including data of initial velocities of hit golf balls which are correlated with the other data; and displaying the computed initial velocity on the mobile computer device.

The instructions may further include computing a launch angle of the hit golf ball from the input information concerning hitting skill and the determined head speed, based on the database, the database further including data of launch angles of hit golf balls which are correlated with other data; and displaying the computed launch angle on the mobile computer device.

The instructions may further include computing a carry distance of the hit golf ball from the input information concerning hitting skill and the determined head speed, based on the database, the database further including data of carry distances of hit golf balls which are correlated with other data; and displaying the computed carry distance on the mobile computer device.

The instructions may further include computing a total distance of the hit golf ball from the input information concerning hitting skill and the determined head speed, based on the database, the database further including data of total distances of hit golf balls which are correlated with other data; and displaying the computed total distance on the mobile computer device.

In the computer program product, the information concerning hitting skill may include an average score or average driver distance. In addition or alternatively, the information concerning hitting skill may include a normal shot shape selected from the group consisting of hook, draw, baby draw, straight, baby fade, fade, and slice. In addition or alternatively, the information concerning hitting skill may include a normal shot height selected from the group consisting of low, medium, and high.

In the computer program product, the two points in the shot moving image for the calibration may be opposite ends of a sleeve box for golf balls in the shot moving image along a longitudinal direction thereof.

The method according to the first aspect may further include:

determining an initial velocity and a launch angle of the golf ball hit by the subject from the shot moving image based on the calibration; and inputting information concerning an observation of the golf ball hit by the subject to the mobile computer device, in this case, the computing step is carried out by computing a golf ball product having a suitable performance for the subject from the input information concerning hitting skill, the determined head speed, the determined initial velocity, the determined launch angle, and the input information concerning observation, based on the database further including data of initial velocities of hit golf balls, data of launch angles of hit golf balls, and data of information concerning observations of hit golf balls which are correlated with the other data.

In the method, the information concerning observation of the hit golf ball may include a trajectory of a shot selected from the group consisting of low, medium, and high. In addition or alternatively, the information concerning observation of the hit golf ball may include a shape of a shot selected from the group consisting of hook, draw, baby draw, straight, baby fade, fade, and slice.

The method may further include displaying the determined initial velocity and the determined launch angle on the mobile computer device.

In the computer program product according to the second aspect of the present invention, the instructions may further include determining an initial velocity and a launch angle of the golf ball hit by the subject from the shot moving image based on the calibration, in this case, the computing step is carried out by computing a golf ball product having a suitable performance for the subject from the input information concerning hitting skill, the determined head speed, the determined initial velocity, the determined launch angle, and information concerning an observation of the golf ball hit by the subject input to the mobile computer device, based on the database further including data of initial velocities of hit golf balls, data of launch angles of hit golf balls, and data of information concerning observations of hit golf balls which are correlated with the other data.

In the computer program product, the information concerning observation of the hit golf ball may include a trajectory of a shot selected from the group consisting of low, medium, and high. In addition or alternatively, the information concerning observation of the hit golf ball may include a shape of a shot selected from the group consisting of hook, draw, baby draw, straight, baby fade, fade, and slice.

The instructions may further include displaying the determined initial velocity and the determined launch angle on the mobile computer device.

According to the third aspect of the present invention, there is provided a method for selecting an appropriate golf ball for a subject by using a mobile computer device with a camera, the method including:

inputting information concerning a hitting skill of the subject to the mobile computer device;

shooting a moving image by the camera of the mobile computer device when the subject hits a golf ball;

performing a calibration of a distance and/or direction between two points in the shot moving image;

determining an initial velocity and a launch angle of the golf ball hit by the subject from the shot moving image based on the calibration;

inputting information concerning an observation on the golf ball hit by the subject to the mobile computer device; and computing a golf ball product having a suitable performance for the subject from the input information concerning the hitting skill and the observation and the determined initial velocity and launch angle based on a database including data of information concerning hitting skills of players, initial velocities and launch angles of hit golf balls, information concerning observations on hit golf balls, and performances of golf ball products, optionally club head speeds and optionally backspin rates of hit golf balls which are correlated with each other; and displaying the computed golf ball product on the mobile computer device.

The method may further include displaying the determined initial velocity and launch angle of the golf ball on the mobile computer device.

The method may further include computing a head speed of a golf club of the subject from the input information concerning the hitting skill and the determined initial velocity and launch angle based on the database, the database further including data of head speeds of golf club which are correlated with the other data; and displaying the computed head speed on the mobile computer device.

The method may further include computing a backspin rate of the hit golf ball from the input information concerning the observation of the hit golf ball and the determined initial velocity and launch angle based on the database, the database further including data of backspin rates of hit golf balls which are correlated with the other data; and displaying the computed backspin rate on the mobile computer device.

The method may further include computing a carry distance of the hit golf ball from the input information concerning the hitting skill and the determined initial velocity and launch angle based on the database, the database further including data of carry distances of hit golf ball which are correlated with the other data; and displaying the computed carry distance on the mobile computer device.

The method may further include computing a total distance of the hit golf ball from the input information concerning the hitting skill and the determined initial velocity and launch angle based on the database, the database further including data of total distances of hit golf ball which are correlated with the other data; and displaying the computed total distance on the mobile computer device.

In the method, the information concerning the hitting skill may be a handicap. The information concerning the observation on the hit golf ball may be a selection from the group consisting of hook, draw, straight, fade, and slice. The two points in the shot moving image for the calibration may be opposite ends of a sleeve box for golf balls in the shot moving image along a longitudinal direction thereof.

The method may further include determining a backspin rate of the golf ball hit by the subject from the shot moving image based on the calibration; and displaying the determined backspin rate on the mobile computer device. The method may further include determining a head speed of a golf club of the subject from the shot moving image based on the calibration; and displaying the determined head speed on the mobile computer device.

According to the fourth aspect of the present invention, there is provided a nonvolatile computer program product for selecting an appropriate golf ball is configured to be stored in a mobile computer device with a camera and has computer program instructions to be executed by the mobile computer device, the instructions including:

determining an initial velocity and a launch angle of a golf ball hit by a subject from a moving image shot by the camera of the mobile computer device when the subject hits the golf ball, based on a calibration of a distance and/or direction between two points in the shot moving image;

computing a golf ball product having a suitable performance for the subject from information concerning a hitting skill of the subject and an observation on the golf ball hit by the subject input to the mobile computer device, and the determined initial velocity and launch angle, based on a database including data of information concerning hitting skills of persons, initial velocities and launch angles of hit golf balls, information concerning observations on hit golf balls, and performances of golf ball products, optionally club head speeds and optionally backspin rates of hit golf balls which are correlated with each other; and displaying the computed golf ball product on the mobile computer device.

In the computer program product, the instructions may further include displaying the determined initial velocity and launch angle of the golf ball on the mobile computer device.

The instructions may further include computing a head speed of golf club of the subject from the input information concerning the hitting skill and the determined initial velocity and launch angle based on the database, the database further including data of head speeds of golf club which are correlated with the other data; and displaying the computed head speed on the mobile computer device.

The instructions may further include computing a backspin rate of the hit golf ball from the input information concerning the observation of the hit golf ball and the determined initial velocity and launch angle based on the database, the database further including data of backspin rates of hit golf balls which are correlated with the other data; and displaying the computed backspin rate on the mobile computer device.

The instructions may further include computing a carry distance of the hit golf ball from the input information concerning the hitting skill and the determined initial velocity and launch angle based on the database, the database further including data of carry distances of a hit golf ball which are correlated with the other data; and displaying the computed carry distance on the mobile computer device.

The instructions may further include computing a total distance of the hit golf ball from the input information concerning the hitting skill and the determined initial velocity and launch angle based on the database, the database further including data of total distances of hit golf ball which are correlated with the other data; and displaying the computed total distance on the mobile computer device.

In the computer program product, the information concerning the hitting skill may be a handicap. The information concerning the observation on the hit golf ball may be a selection from the group consisting of hook, draw, straight, fade, and slice. The two points in the shot moving image for the calibration may be opposite ends of a sleeve box for golf balls in the shot moving image along a longitudinal direction thereof.

In the computer program product, the instructions may further include determining a backspin rate of the golf ball hit by the subject from the shot moving image based on the calibration; and displaying the determined backspin rate on the mobile computer device. The instructions may further include determining a head speed of a golf club of the subject from the shot moving image based on the calibration; and displaying the determined head speed on the mobile computer device.

DETAILED DESCRIPTION OF THE PREFERRED EMBODIMENT

Hereinafter, embodiments of a method for selecting an appropriate golf ball by using a mobile computer device with a camera and a computer program product therefor according to the present invention will be described with reference to the accompanying drawings.

First Embodiment

Figure 1:
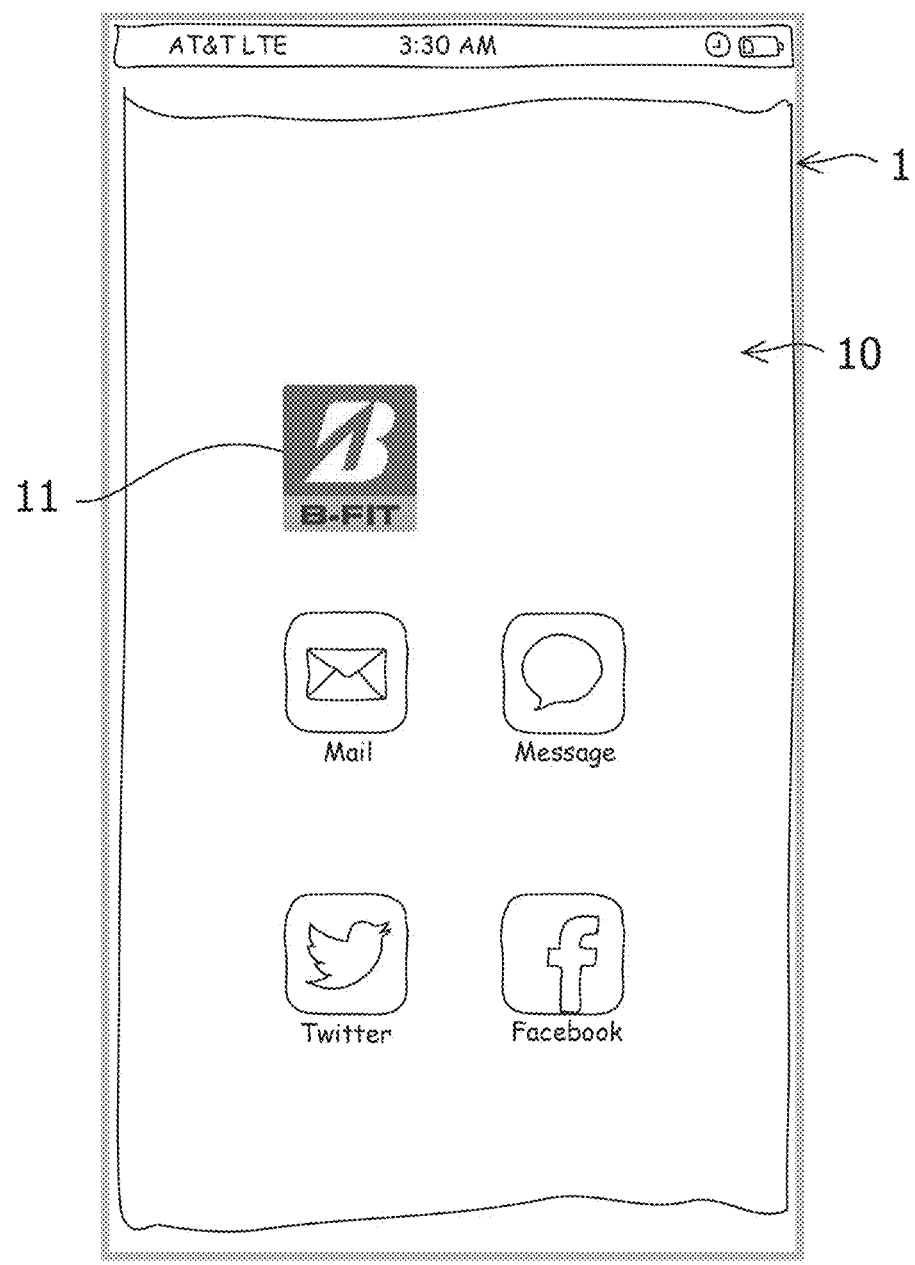
FIG. 1 is a view showing a display of a mobile computer device for an embodiment of a method for selecting an appropriate golf ball by using a mobile computer device with a camera according to the present invention.

A computer program for performing an embodiment of a method for selecting an appropriate golf ball according to the present invention is installed in a mobile computer device having a touch panel 1, as shown in FIG. 1. The mobile computer device includes a data storage unit (not shown), in which the computer program is stored, and a central processing unit, i.e., CPU, (not shown) for executing program instructions in the computer program. Also, the mobile computer device includes a RAM, a ROM and the like necessary for execution of the CPU, but not shown in FIG. 1. To simplify description of the embodiment of the method for selecting an appropriate golf ball, which will be described below, to give priority to understanding of the present invention, description about reading of data by means of the RAM is omitted.

The touch panel 1 serves not only a display unit for displaying information calculated by the CPU, but also an input unit for inputting information to the device by touching the panel directly. The mobile computer device includes a camera (not shown) for shooting a still image and moving image and further includes a network interface (not shown) for receiving a variety of data stored in a host server via a network such as the Internet and for sending a variety of data to be stored in the host server.

The touch panel 1, the CPU, the camera and the network interface are connected to the data storage unit communicably, so that the information input from the touch panel 1, the camera and the network interface is sent to the data storage unit and is further sent to the CPU for performing the computer program.

The computer program product includes a database which is formed by storing past results of selecting an appropriate golf ball for a great number of people. The database includes data of information concerning hitting skills of the great number of people, data of head speeds of golf clubs immediately before the great number of players hit golf balls, and data of performances of golf ball products, which are correlated with each other. The database is stored in the data storage unit.

The information concerning hitting skills may include, but is not limited to, an average score, average driver distance, or any combination thereof. The information concerning hitting skills may include a normal shot shape selected from the group consisting of hook, straight and slice, preferably of hook, draw, straight, fade and slice, more preferably of hook, draw, baby draw, straight, baby fade, fade, and slice. The information concerning hitting skill may include a normal shot height or trajectory selected from the group consisting of low, medium, and high.

The data of performances of golf ball products may include, but is not limited to, for example, a ball type selected from the group of consisting of solid type ball, soft type ball, distance type ball, low trajectory type ball, mid trajectory type ball, high trajectory type ball, low spin type ball, mid spin type ball, high spin type ball, and distance/spin type ball. The data of performances of golf ball products are associated with their product names or brands, e.g., "Titleist," and their ball models, e.g., "ProV1."

The database may further include data of information concerning subjects (e.g., age, gender, current ball type, and preferred ball type), data of initial velocities of golf balls hit by a great number of people, data of launch angles of golf balls hit by a great number of people, data of carry distances of golf balls hit by a great number of players and measured by exclusive measuring instrument, and/or data of total distances of golf balls hit by a great number of players and measured by exclusive measuring instrument. These additional data are also correlated with the essential data mentioned above.

Any data in the database stored in the data storage unit of the mobile computer device may be changed freely or optionally by using updated data or added data through the network interface of the mobile computer device.

An embodiment of the method for selecting an appropriate golf ball using the mobile computer device having the configuration described above will be described below.

As shown in FIG. 1, the touch panel 1 of the mobile computer device displays a standby screen 10, on which an icon 11, i.e., "B-FIT," for starting the computer program of the present embodiment is placed as well as other icons. The icon 11 is tapped to start the computer program.

Figure 2:
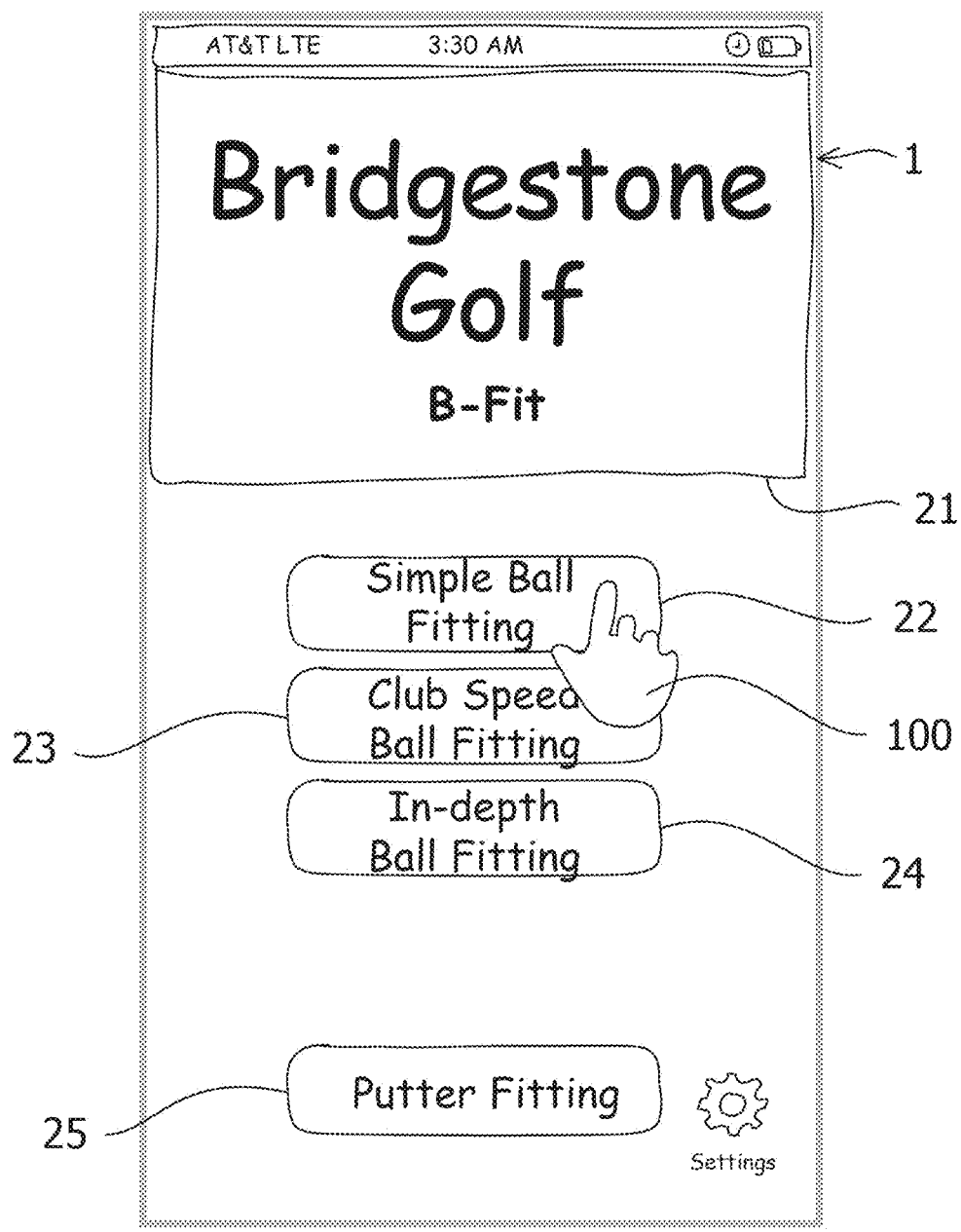
FIG. 2 is a view showing the display when a computer program starts up in the embodiment of the method according to the present invention.

As shown in FIG. 2, when the computer program starts up, the touch panel 1 displays a program name 21, i.e., "Bridgestone Golf B-Fit," and buttons for selecting an appropriate golf ball for a subject by three different ways, i.e., the first button 22 for "Simple Ball Fitting," the second button 23 for "Club Speed Ball Fitting" and the third button 24 for "In-depth Ball Fitting." The touch panel 1 also may display a button 25 for performing another course, e.g., putter fitting, which is not described in the present specification.

In this embodiment, first, the button 22 for "Simple Ball Fitting" is tapped by the subject 100 to start the selecting an appropriate golf ball by only imputing information concerning the subject, which includes information concerning hitting skills of the subject, by the touch panel 1.

Figure 3:
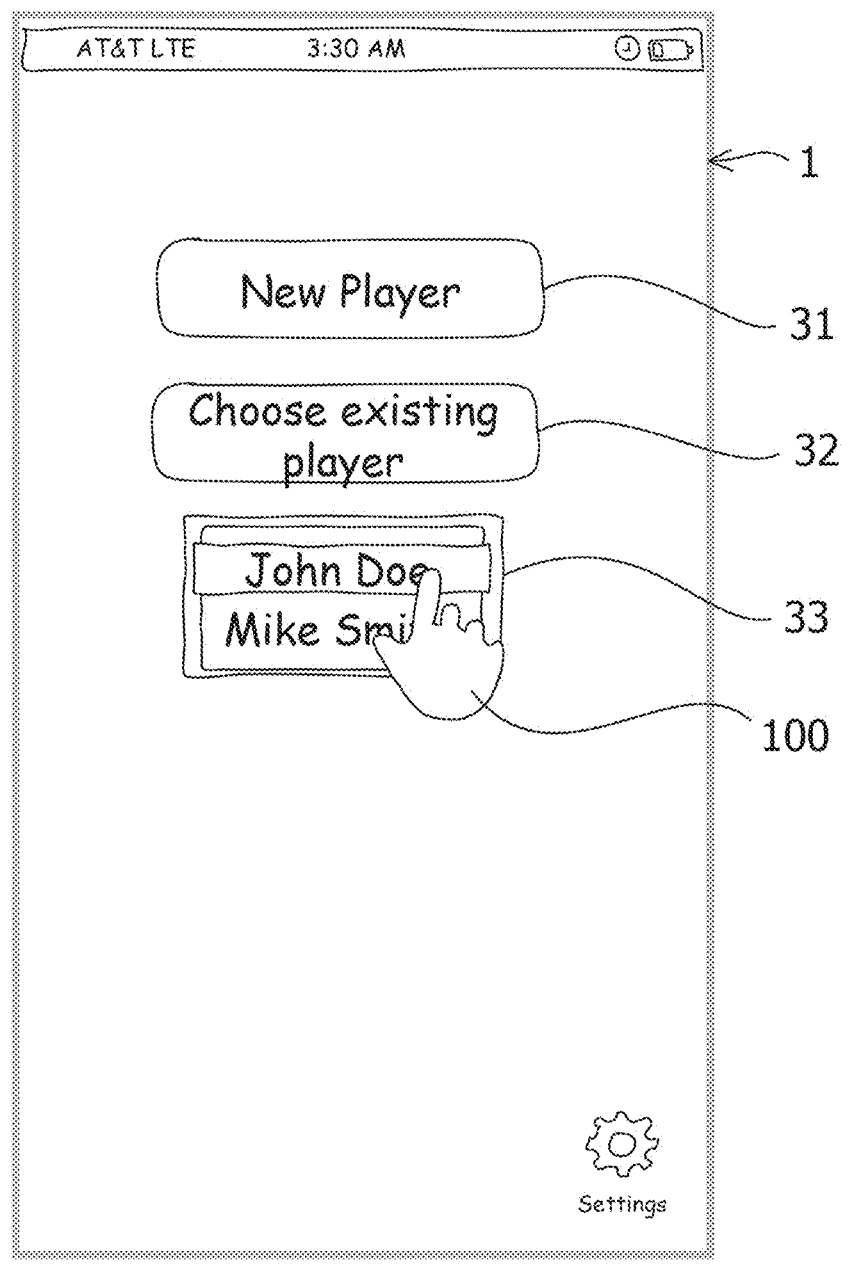
FIG. 3 is a view showing the display when a new or existing player is selected as a subject in the embodiment of the method according to the present invention.

As shown in FIG. 3, the touch panel 1 displays a button 31 for choosing a "New Player" and a button 32 for choosing "Choose existing players," which are selected for the subject. If the button 32 of "Choose existing players" is selected, the touch panel 1 displays a pull-down menu 33 including one or more player's names to be chosen, whose data are already stored.

Figure 4:
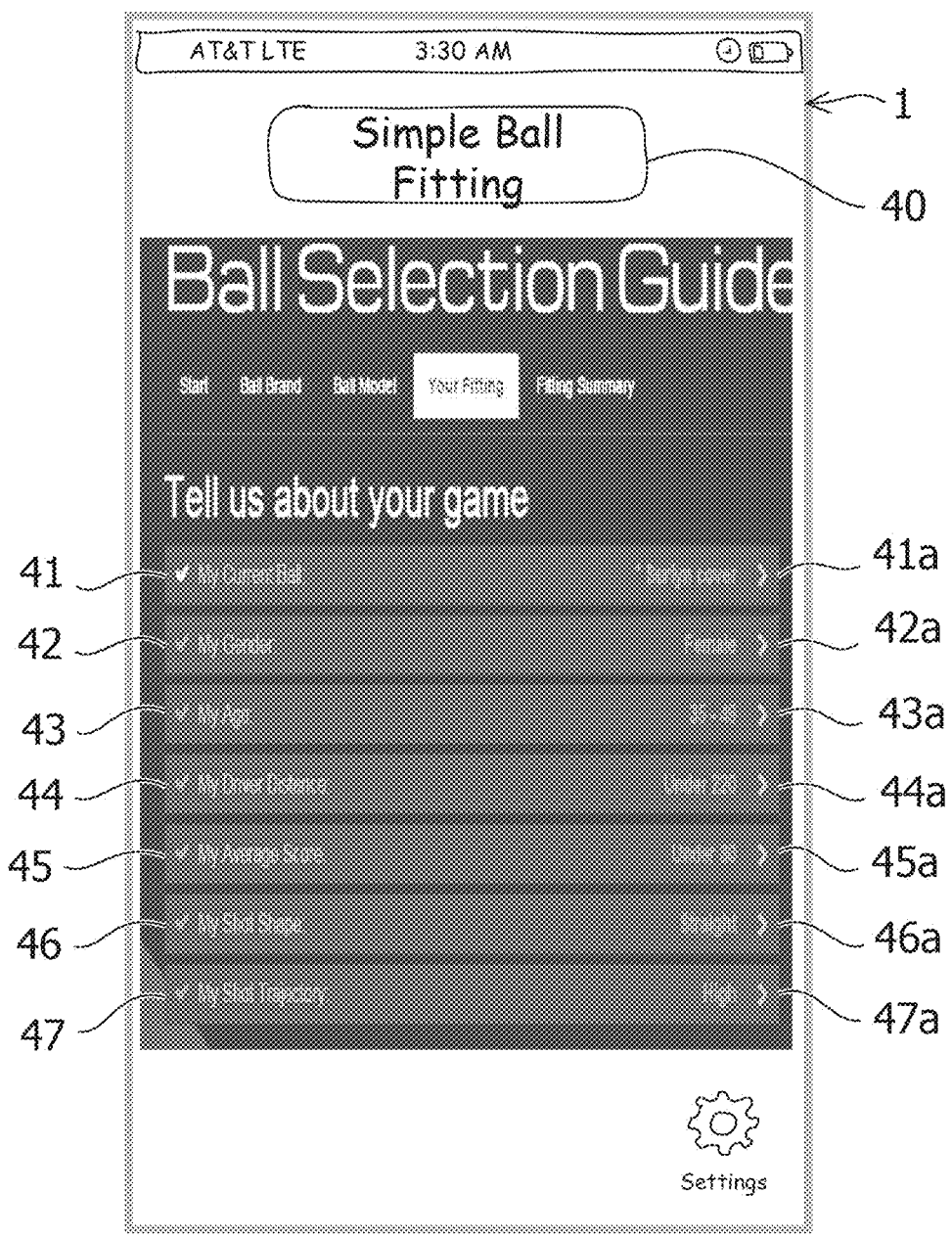
FIG. 4 is a view showing the display when information for Simple Ball Fitting is input to the device in the embodiment of the method according to the present invention.

When the button 31 of "New Player" is tapped, the touch panel 1 displays plural items to be input, as shown in FIG. 4. The plural items include, for example, an item 41 of "My Current Ball," an item 42 of "My Gender," an item 43 of "My Age," an item 44 of "My Driver Distance," an item 45 of "My Average Score," an item 46 of "My Shot Shape," an item 47 of "My Shot Trajectory," which are input by pull-down menus 41a to 47a, respectively. The item "My Current Ball" means a ball type and may be selected from the group mentioned above. High or low spin type ball may be expressed by cover materials such as "Surlyn cover" and "polyurethane cover." When an existing player's name is tapped on the screen shown in FIG. 3, the previous selected values for the items 41 to 47 on the screen shown in FIG. 4 are represented and may be changed.

After all of the items 41 to 47 are input, the CPU reads the database and specifies one golf ball product having a suitable performance for the subject from the database based on the input information. The specified golf ball product is displayed on the touch panel 1.

Next, "Club Speed Ball Fitting" is described below. The button 23 of "Club Speed Ball Fitting" on the screen shown in FIG. 2 is tapped to start the selecting an appropriate golf ball for the subject from a head speed of a golf club when the subject hits a golf ball. In the case of the Club Speed Ball Fitting, the touch panel 1 shows the player selecting screen shown in FIG. 3.

Figure 5:
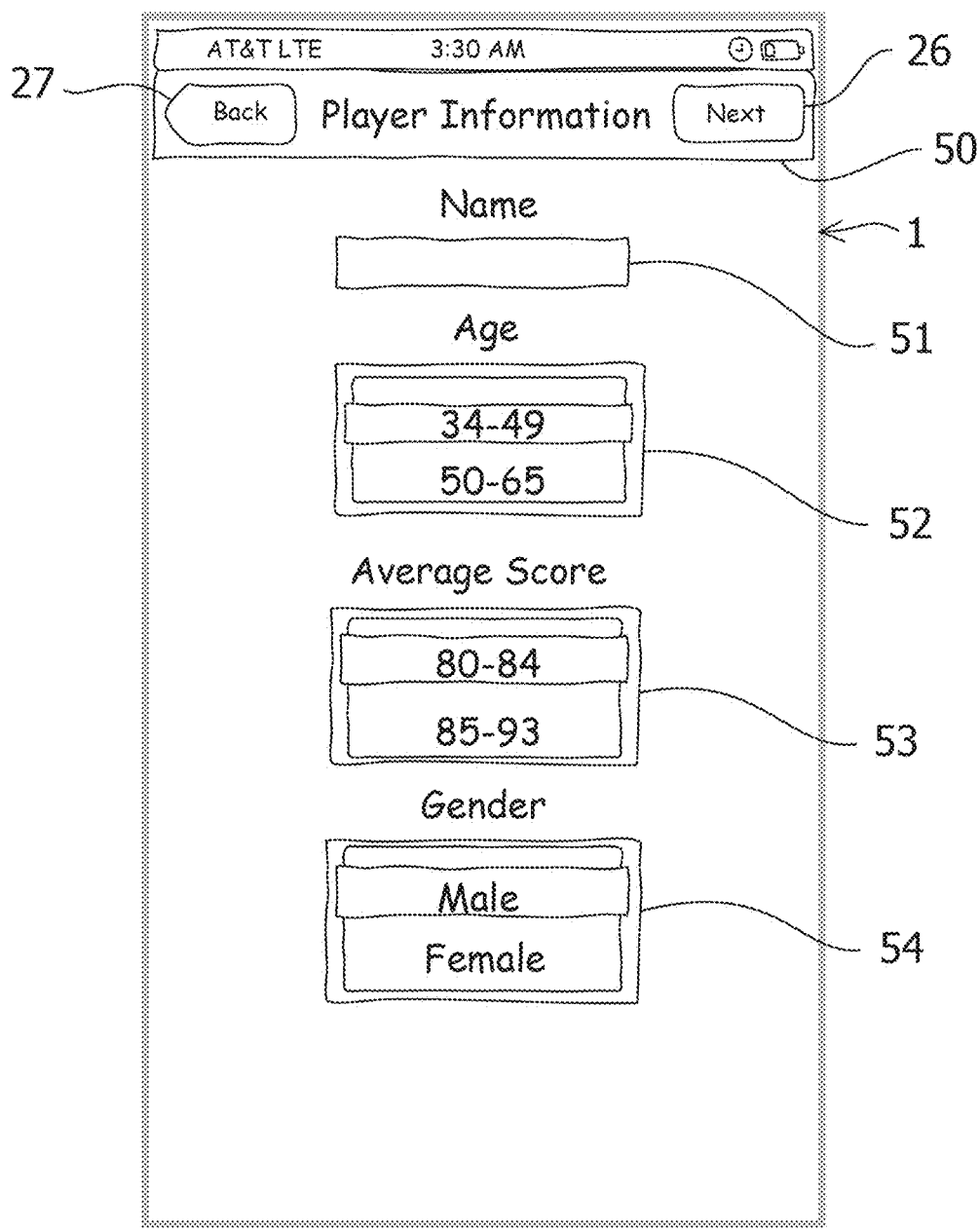
FIGS. 5 to 7 are views showing the display when information of a subject including information concerning hitting skills of the subject is input to the device in the embodiment of the method according to the present invention.

When the button 31 of "New Player" is tapped, as shown in FIG. 5, the touch panel 1 shows a screen for inputting information concerning a subject and hitting skills thereof, which includes an input box 51 for "Name," a pull-down menu 52 for "Age," a pull-down menu 53 for "Average Score" and a pull-down menu 54 for "Gender." The subject enters the subject's name in the box 51 and drags or flicks the pull-down menus 52-54 so that the subject's age, average score, and gender each is located in its selection field.

Figure 6:
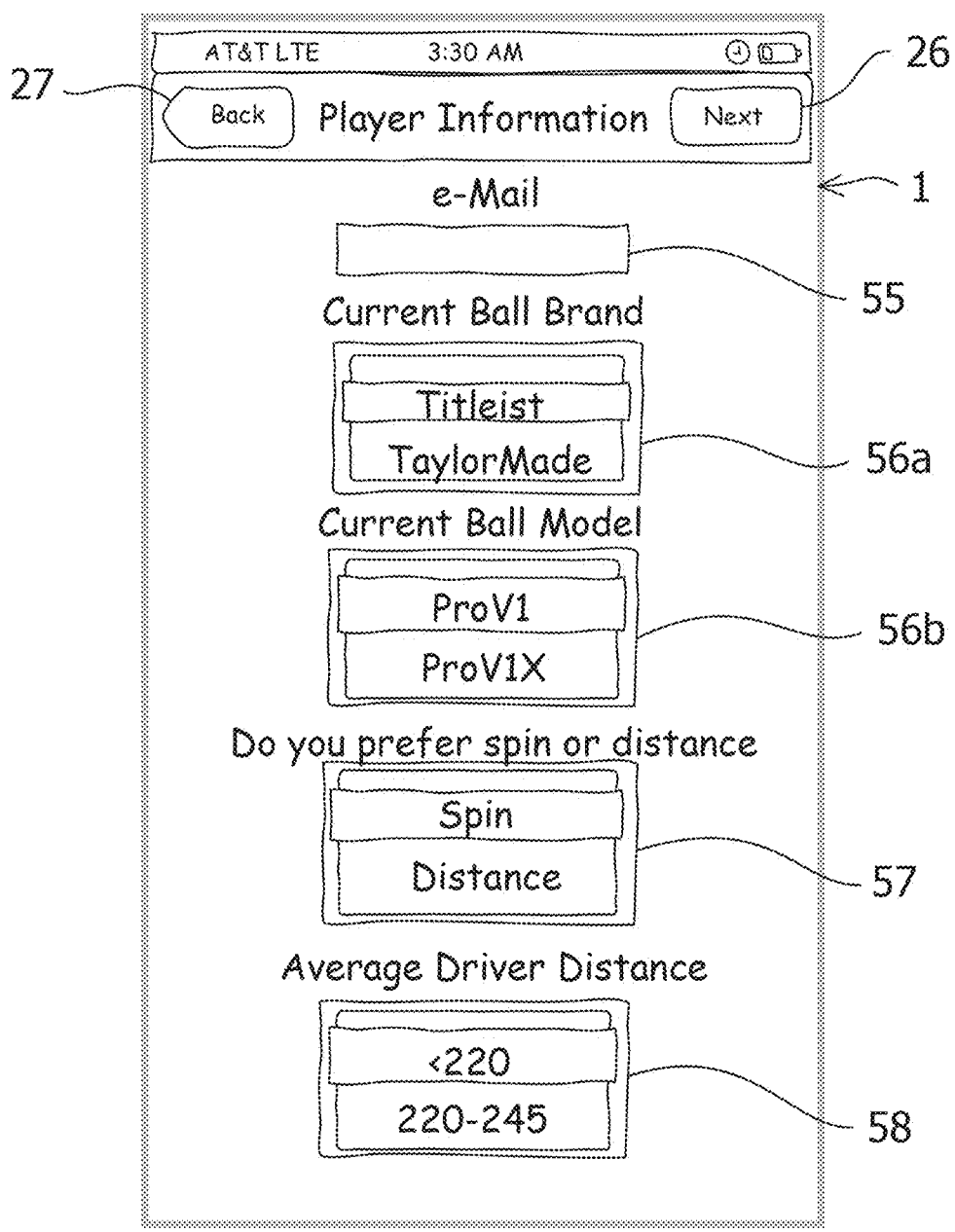

When a "Next" button 26 displayed on an upper-right area of the screen is tapped, as shown in FIG. 6, the touch panel 1 shows another screen for inputting information concerning the subject and his hitting skills, which includes an input box 55 for "e-mail," pull-down menus 56 for choosing a ball type that the subject uses, such as "Current Ball Brand" and "Current Ball Model," a pull-down menu 57 for choosing a preferred ball type, e.g., for answering to the question "Do you prefer spin or distance," and a pull-down menu 58 for "Average Driver Distance." The subject enters the subject's e-mail in the box 55 and drags or flicks the pull-down menus 56-58 so that the subject's current ball type, preferred ball type and average driver score each is located in its selection field. A "Back" button 27 displayed on an upper-left area of the screen is tapped to return to the previous screen.

Figure 7:
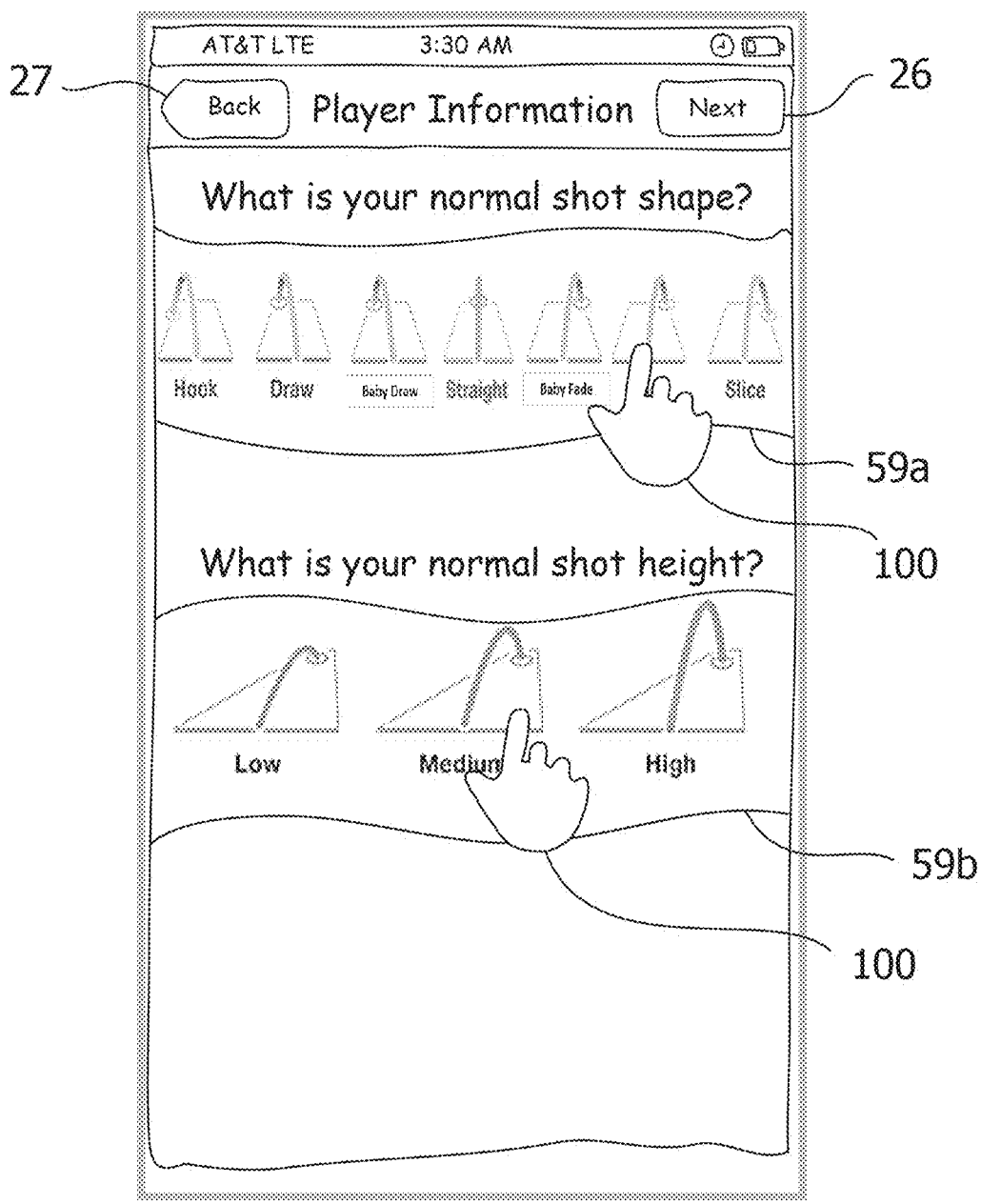

When the "Next" button 26 is tapped, as shown in FIG. 7, the touch panel 1 further shows another screen for inputting information concerning the subject's hitting skills, which includes a plurality of listed images 59a for choosing the subject's normal shot shape, and a plurality of listed images 59b for choosing the subject's normal shot height, e.g., for answering to the questions "What is your normal shot shape?" and "What is your normal shot height?" The subject taps or clicks the most suitable one from the plurality of listed images 59a of normal shot shapes, e.g., "Hook," "Draw," "Baby Draw," "Straight," "Baby Fade," "Fade" and "Slice." Also, the subject taps or clicks the most suitable one from the plurality of listed images 59b of normal shot heights, e.g., "Low," "Medium" and "High."

When the "Next" button 26 is tapped, the input information concerning the subject and the hitting skills thereof is sent from the touch panel 1 to the data storage unit and is stored therein. When an existing player's name is tapped on the screen shown in FIG. 3, the previous selected values for the information concerning the subject and the hitting skills thereof 51 to 59 on the screens shown in FIGS. 5 to 7 are represented and may be changed.

Figure 8:
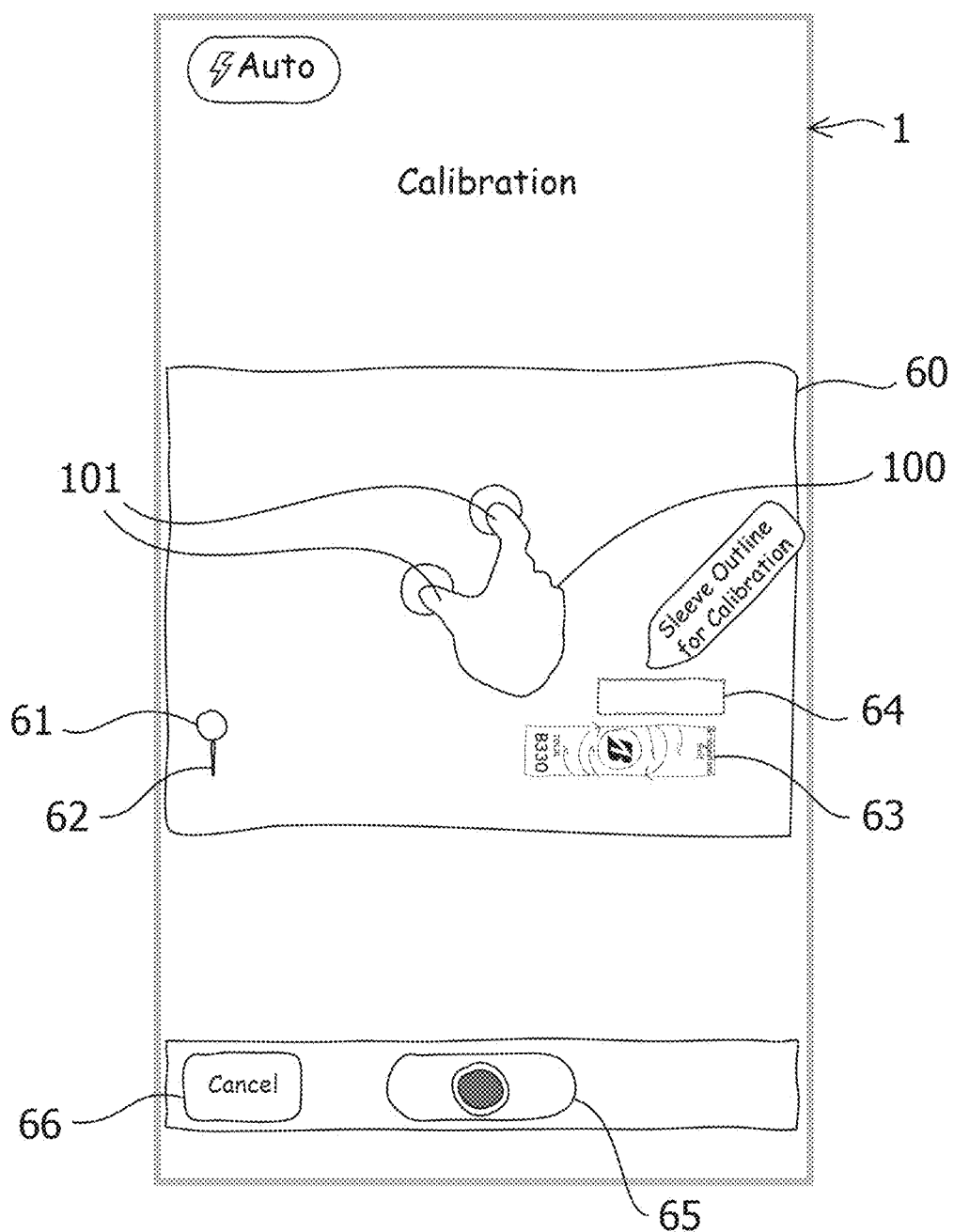
FIGS. 8 to 10 are views showing the display during a calibration for shooting a moving image in the embodiment of the method according to the present invention.

A calibration is carried out before shooting a moving image, because a moving image has to be shot at an angle and in a size sufficient to calculate a head speed of a golf club when the subject hit a golf ball from the shot moving image. As shown in FIG. 8, a sleeve box 63 for three golf balls is placed on the ground near a golf ball 61, which is supported by a golf tee 62 off the ground, so that the golf ball and the sleeve box 63 are contained in a picture 60 on the touch panel 1 for shooting a moving image by the camera. The camera may be moved closer and further away from the golf ball 61 and the sleeve box 63.

Figure 9:
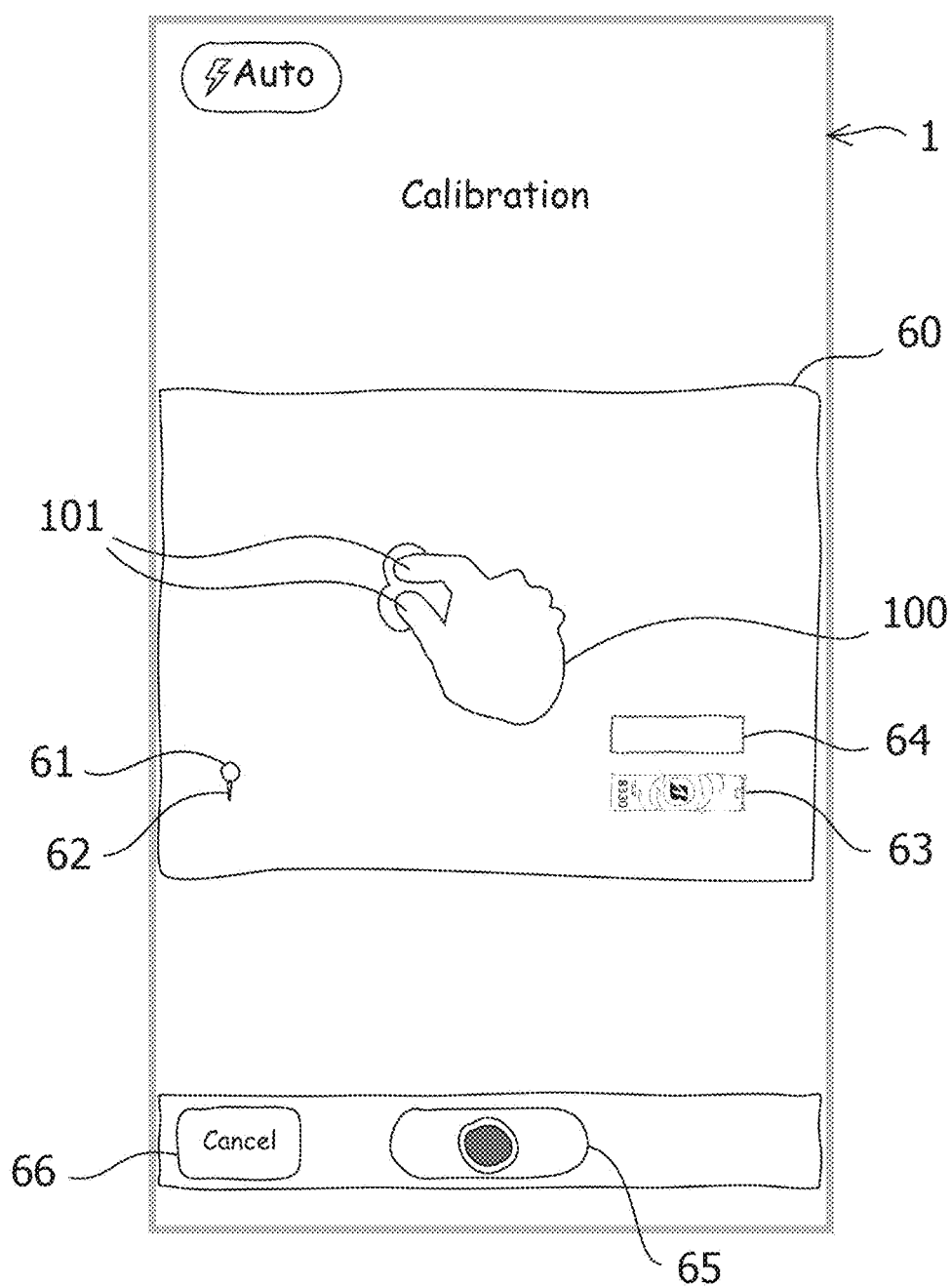
Figure 10:
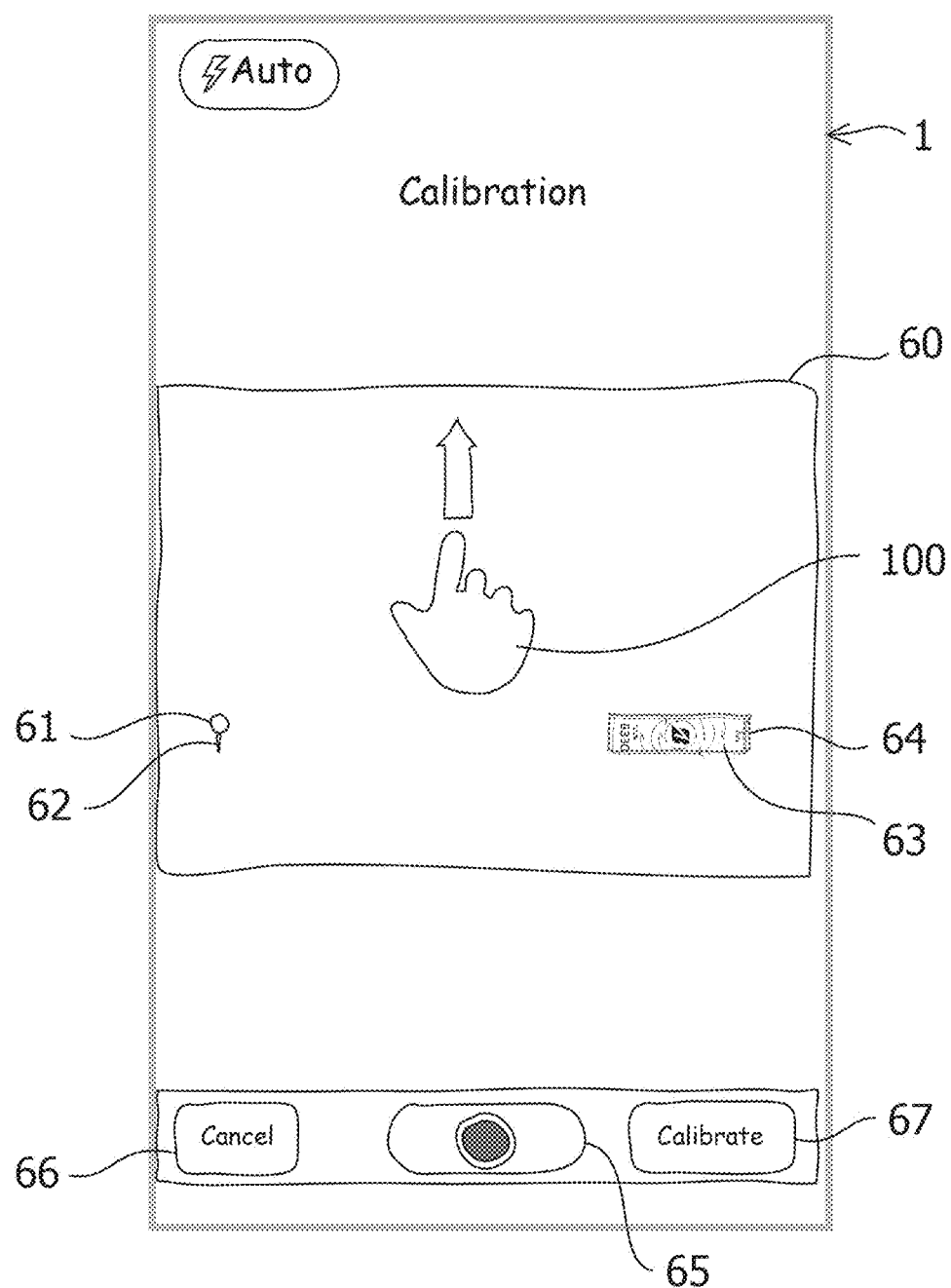

As, shown in FIG. 9, the picture 60 is enlarged and reduced by pinch-out and pinch-in operations of operator's fingers 101 to fit the size of the sleeve box 63 to an outline for calibration 64 displayed on the picture 60. In addition, as shown in FIG. 10, the picture 60 is scrolled up and down and right and left by swiping up and down and swiping right and left to fit the position of the sleeve box 63 to the outline for calibration 64.

When the size and position of the sleeve box 63 are fitted to the size and the position of the outline for calibration 64, a button 67 of "Calibrate" is tapped. Thus, a predetermined distance between two points (i.e., a known length of the sleeve box 44) and a horizontal line (i.e., a longitudinal edge of the sleeve box 44) in a moving image to be shot can be calibrated. A button 66 of "Cancel" is tapped to return to the previous screen (i.e., the entering the essential data).

Figure 11:
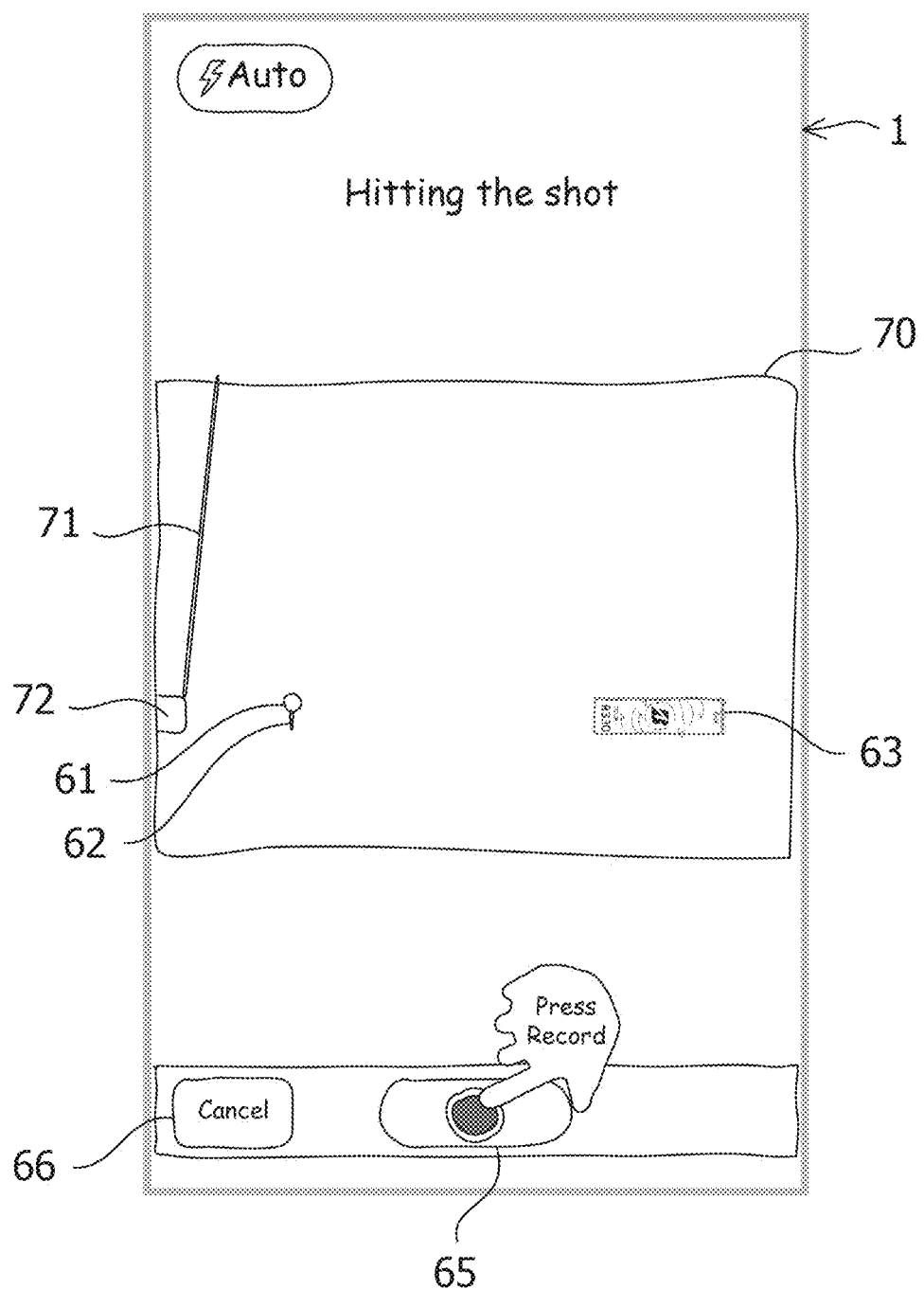
FIGS. 11 to 14 are views showing the display when the camera of the device shoots a moving image on a golf ball hit by the subject in the embodiment of the method according to the present invention.
Figure 12:
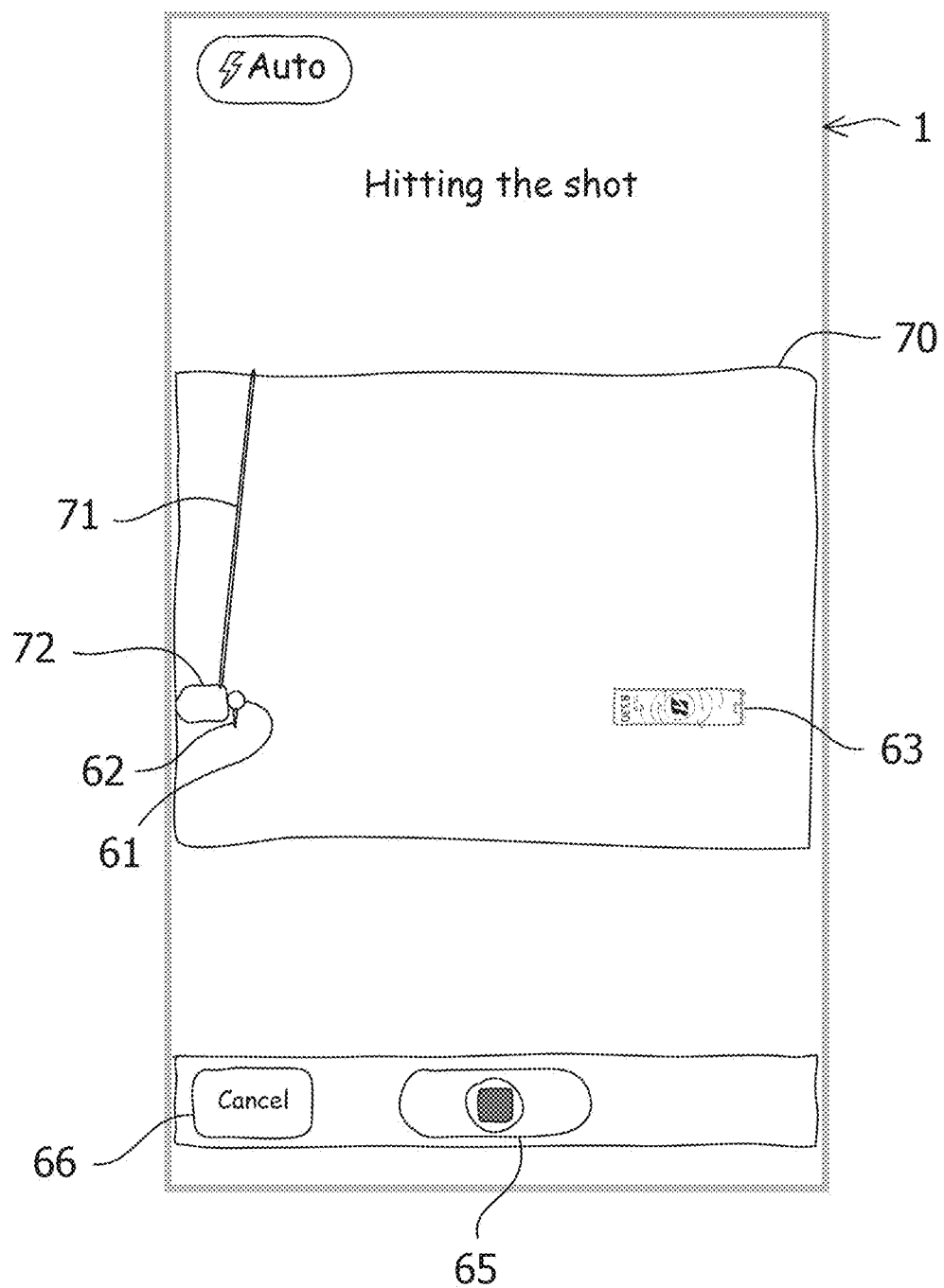
Figure 13:
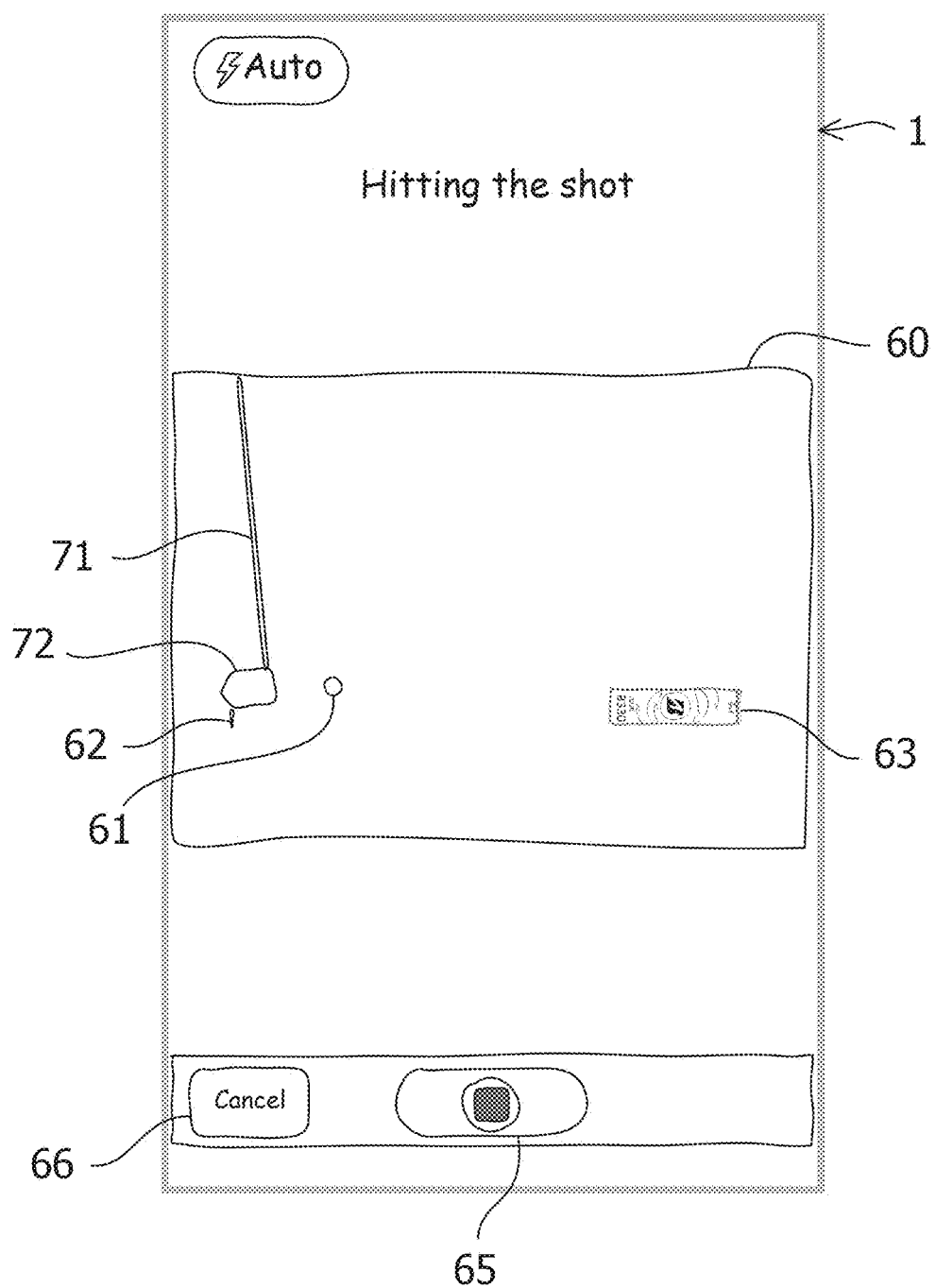
Figure 14:
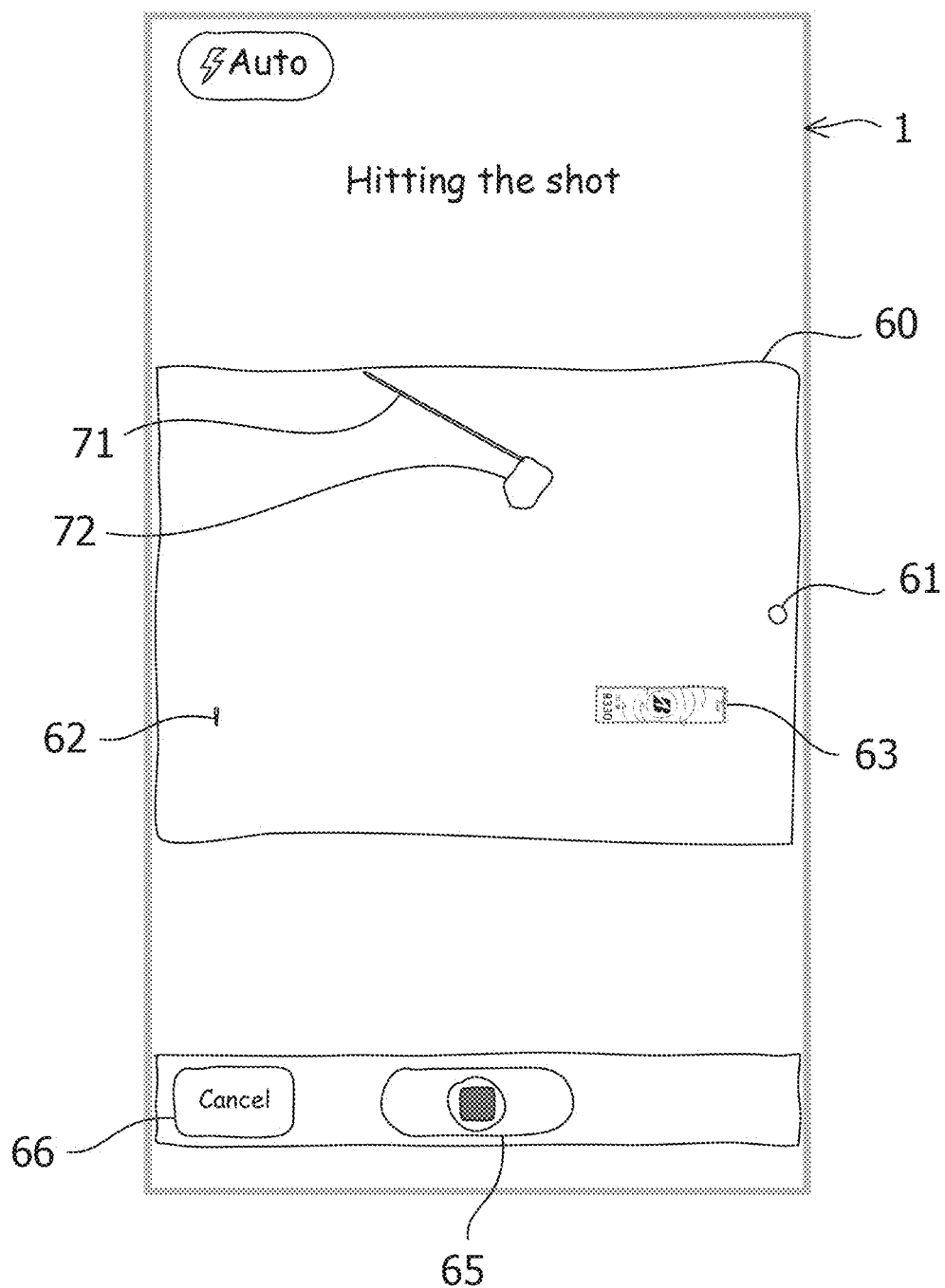

After the calibration is carried out, a moving image is shot by the camera of the mobile computer device when the subject hits a golf ball. As shown in FIG. 11, when the subject hits the golf ball 61 by a golf club 71, a start/stop button 65 is tapped to shoot a moving image. As shown in FIGS. 12 to 14, the camera has to be securely fixed in place during shooting the moving image. A frame rate may be at least 240 fps. A microphone of the mobile computer device may record the impact sound between the golf ball 61 and a head 72 of the golf club 71. After the subject hit the golf ball, the start/stop button 65 is tapped to send data of the shot moving image to the data storage unit.

Figure 15:
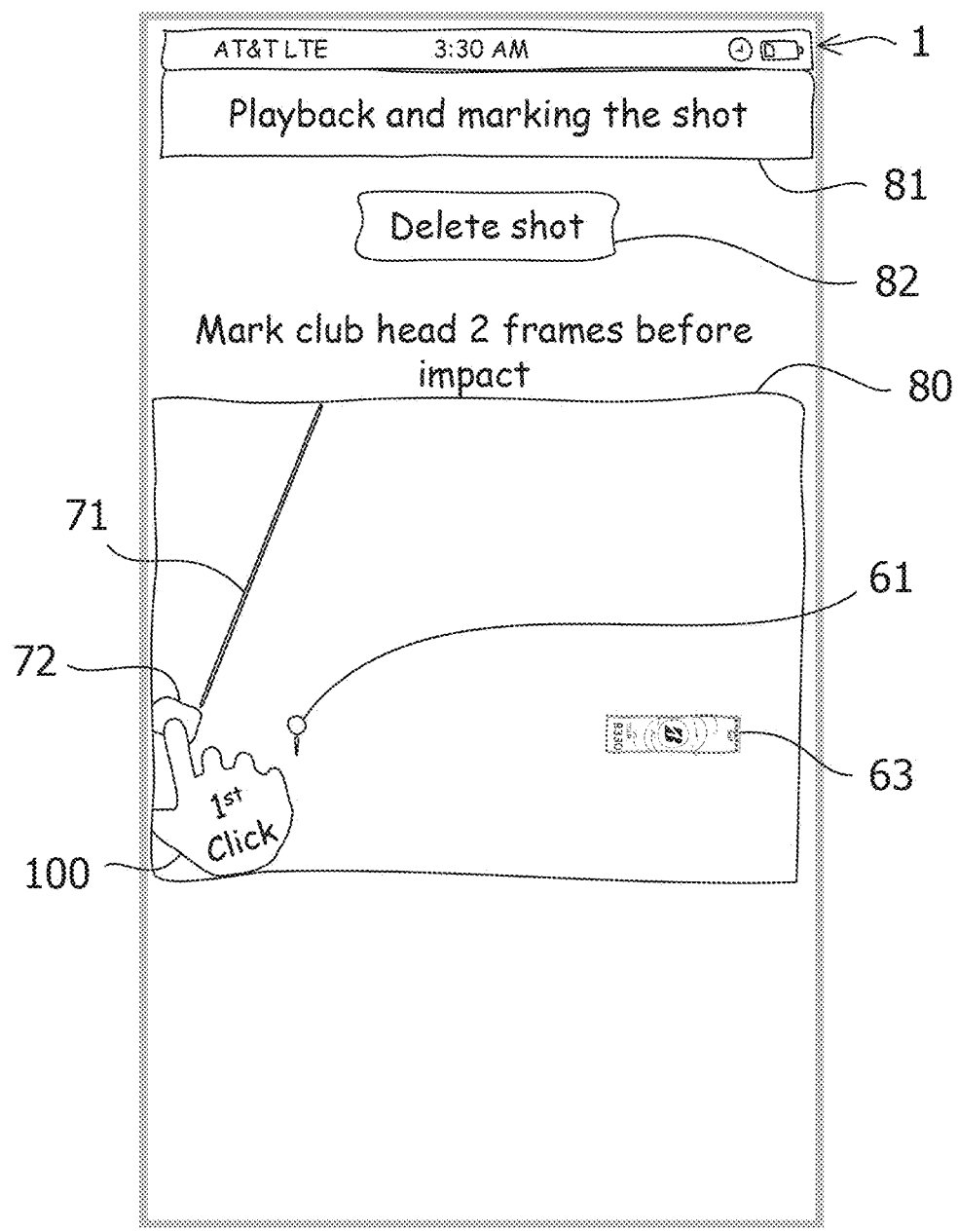
FIGS. 15 and 16 are views showing the display when two frames in the shot moving image are selected for Club Speed Ball Fitting in the embodiment of the method according to the present invention.
Figure 16:
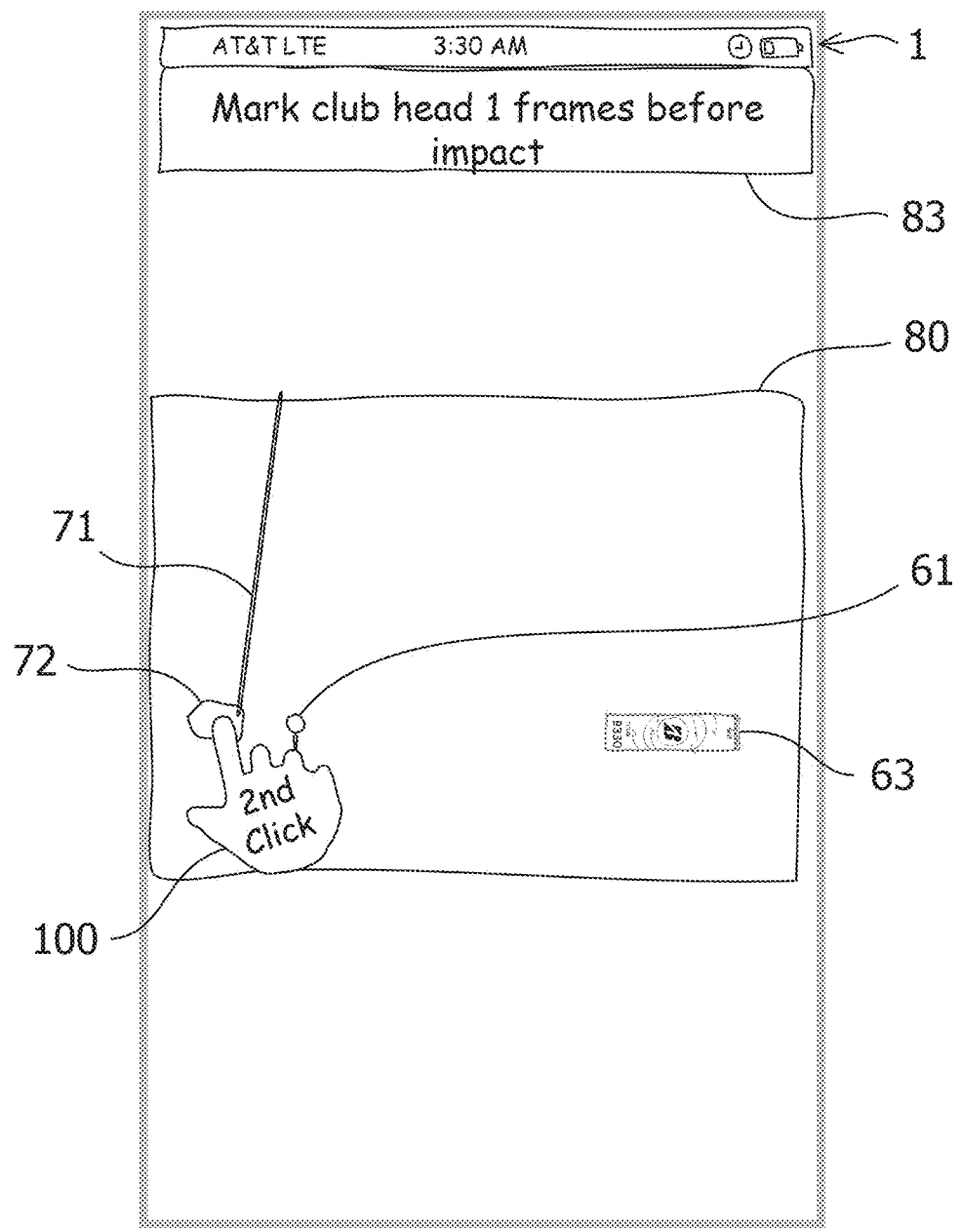

After shooting the moving image, a marking operation is performed to accurately determine a head speed of the golf club from the shot moving image. When the CPU reads the data of the shot moving image, as shown in FIG. 15, a playback of the shot moving image 80 is performed on the touch panel 1. Preferably, the shot moving image rewinds before the impact between the ball and the head based on the recorded impact sound. As shown in FIGS. 15 and 16, two frames in the shot moving image before the impact are tapped or clicked by the operator 100. The rewinding and advancing of the shot moving image can be performed by swiping left or right. Shooting a moving image can be repeated any number of times. If a button 66 of "Delete Shot" is tapped, the shot moving image is deleted.

According to the computer program, the CPU computes the two positions of the golf club head from the shot moving image based on the calibration to determine a moving distance of the head per a time (second) immediately before the impact, i.e., a head speed. The information of the determined head speed is sent to the data storage unit and is stored therein.

The CPU reads the database, the input information concerning the subject and the hitting skills thereof, and the determined head speed stored in the data storage unit. The CPU specifies one golf ball product having a suitable performance for the subject from the database based on the read information mentioned above.

The CPU may specify an initial velocity of the golf ball hit by the subject from the database based on the input information concerning the subject and the hitting skills thereof, and the determined head speed stored in the data storage unit.

The CPU may specify a launch angle of the golf ball hit by the subject from the database based on the input information concerning the subject and the hitting skills thereof, and the determined head speed stored in the data storage unit.

The CPU may specify a carry distance of the golf ball hit by the subject from the database based on the input information concerning the subject and the hitting skills thereof, and the determined head speed stored in the data storage unit.

The CPU may specify a total distance of the golf ball hit by the subject from the database based on the input information concerning the subject and the hitting skills thereof, and the determined head speed stored in the data storage unit.

Figure 17:
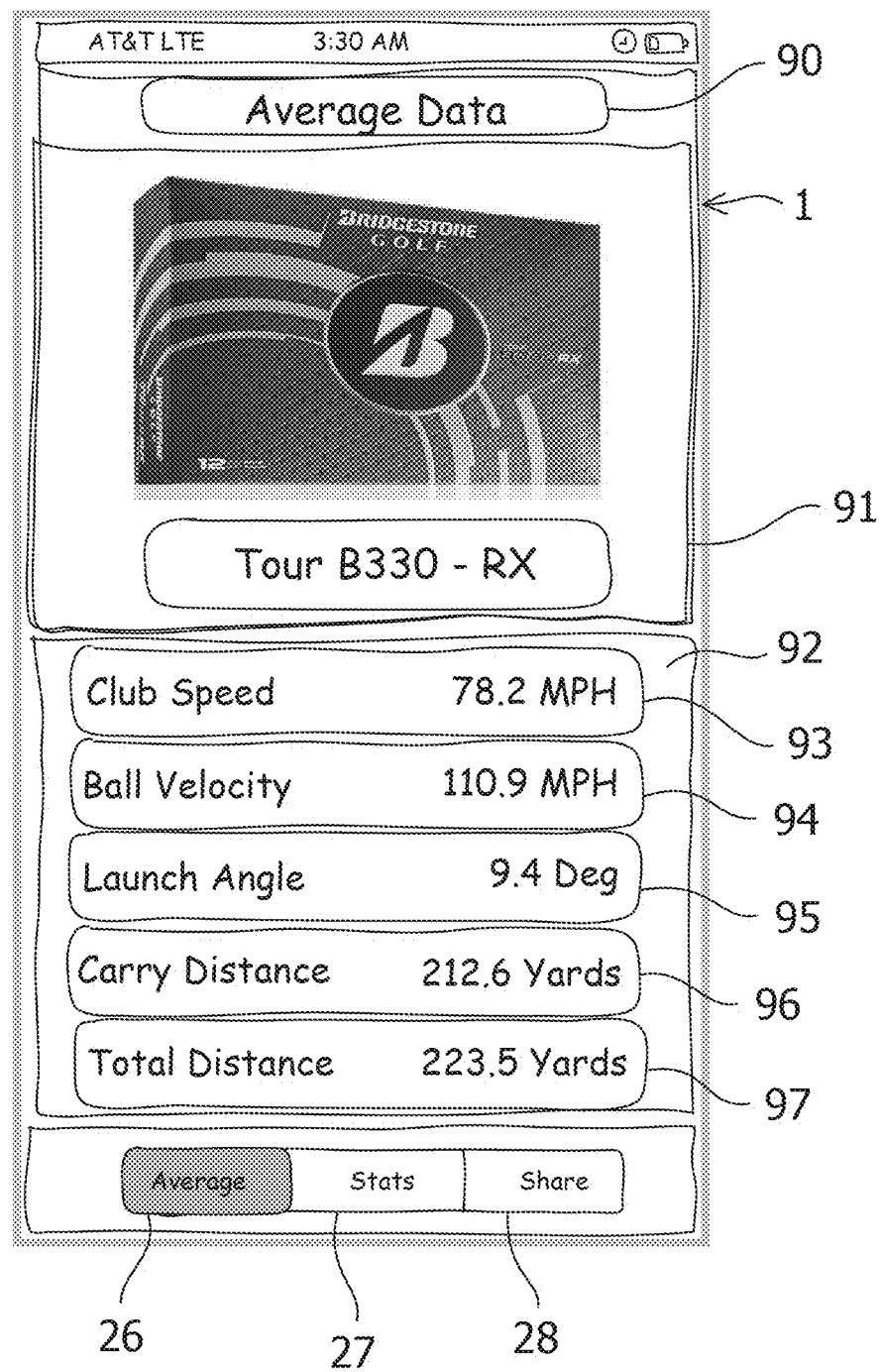
FIGS. 17 and 18 are views showing the display when information concerning a golf ball product having a suitable performance is provided to the subject by Club Speed Ball Fitting in the embodiment of the method according to the present invention.

The CPU may calculate each average value of the determined club head speeds, the specified initial velocities, the specified launch angles, the specified carry distances, and the specified total distances stored in the data storage unit As shown in FIG. 17, the touch panel 1 displays a product name of the specified golf ball product having a suitable performance for the subject 91, the average club head speed 93, the average initial velocity 94, the average launch angle 95, the average carry distance 96, and the average total distance 97. A photograph showing a package of the specified golf ball product having a suitable performance for the subject may be displayed as well as the product name by using the network interface.

Figure 18:
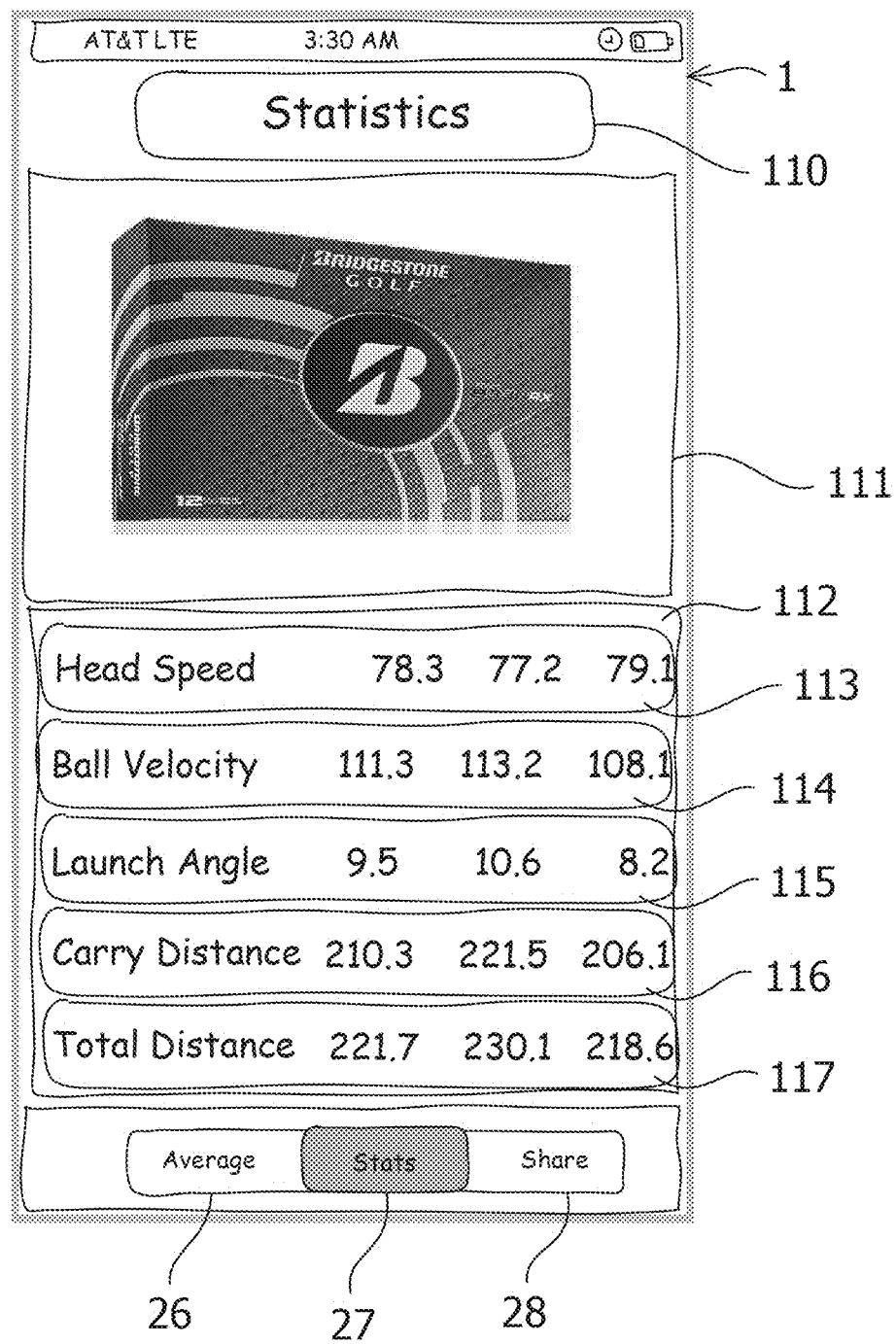

Also, as shown in FIG. 18, the touch panel 1 displays the determined club head speeds 113, the specified initial velocities 114, the specified launch angles 115, the specified carry distances 116, and the specified total distances 117 based on the records for the past three times as well as the product name of the specified golf ball product 111.

Furthermore, "In-depth Ball Fitting" is described below. The button 24 of "In-depth Ball Fitting" on the screen shown in FIG. 2 is tapped to start the selecting an appropriate golf ball for the subject from the head speed with an initial velocity and launch angel of the hit golf ball. The In-depth Ball Fitting shares the same steps in the Club Speed Ball Fitting mentioned above.

Figure 19:
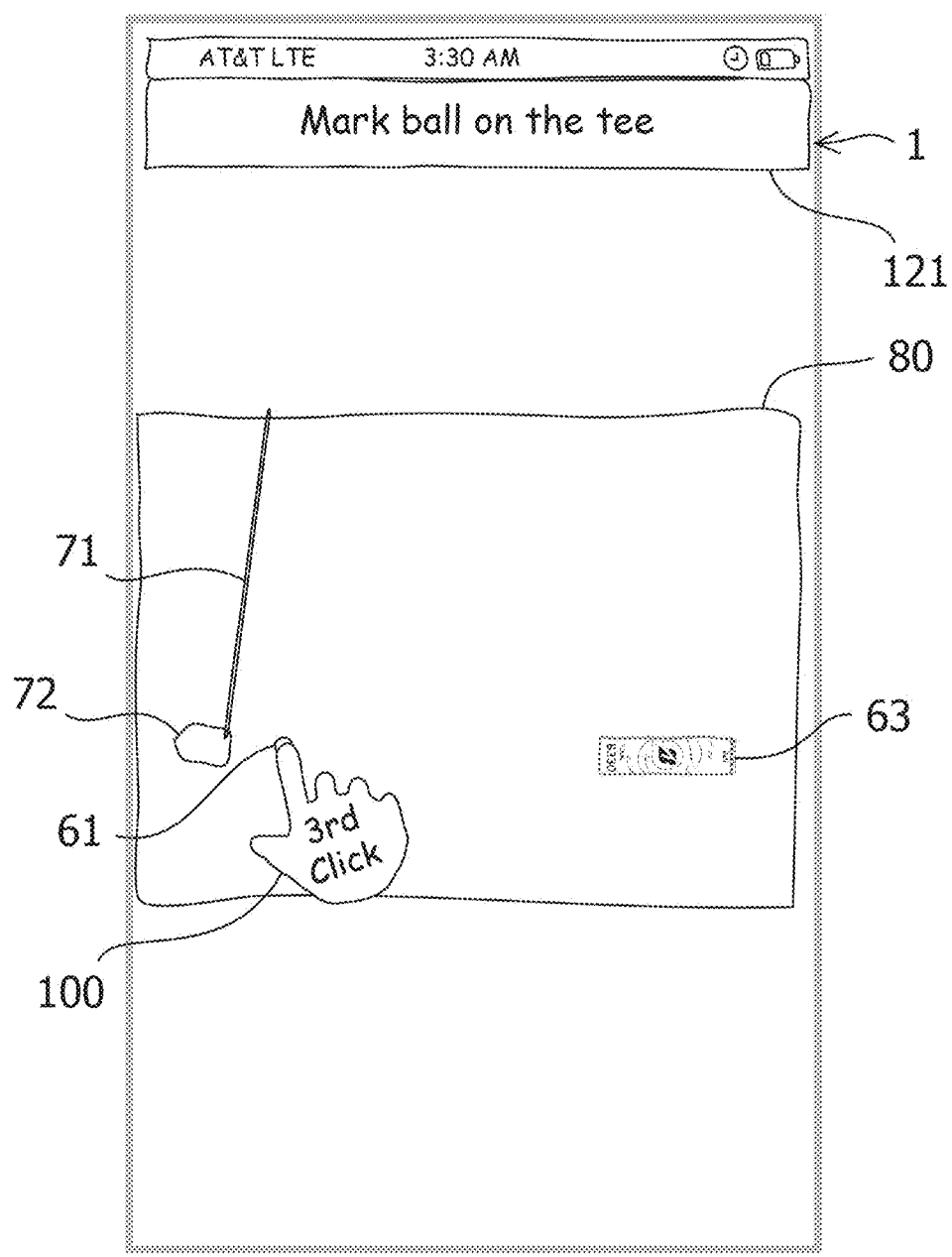
FIGS. 19 to 21 are views showing the display when three frames in the shot moving image are selected for In-depth Ball Fitting in the embodiment of the method according to the present invention.
Figure 20:
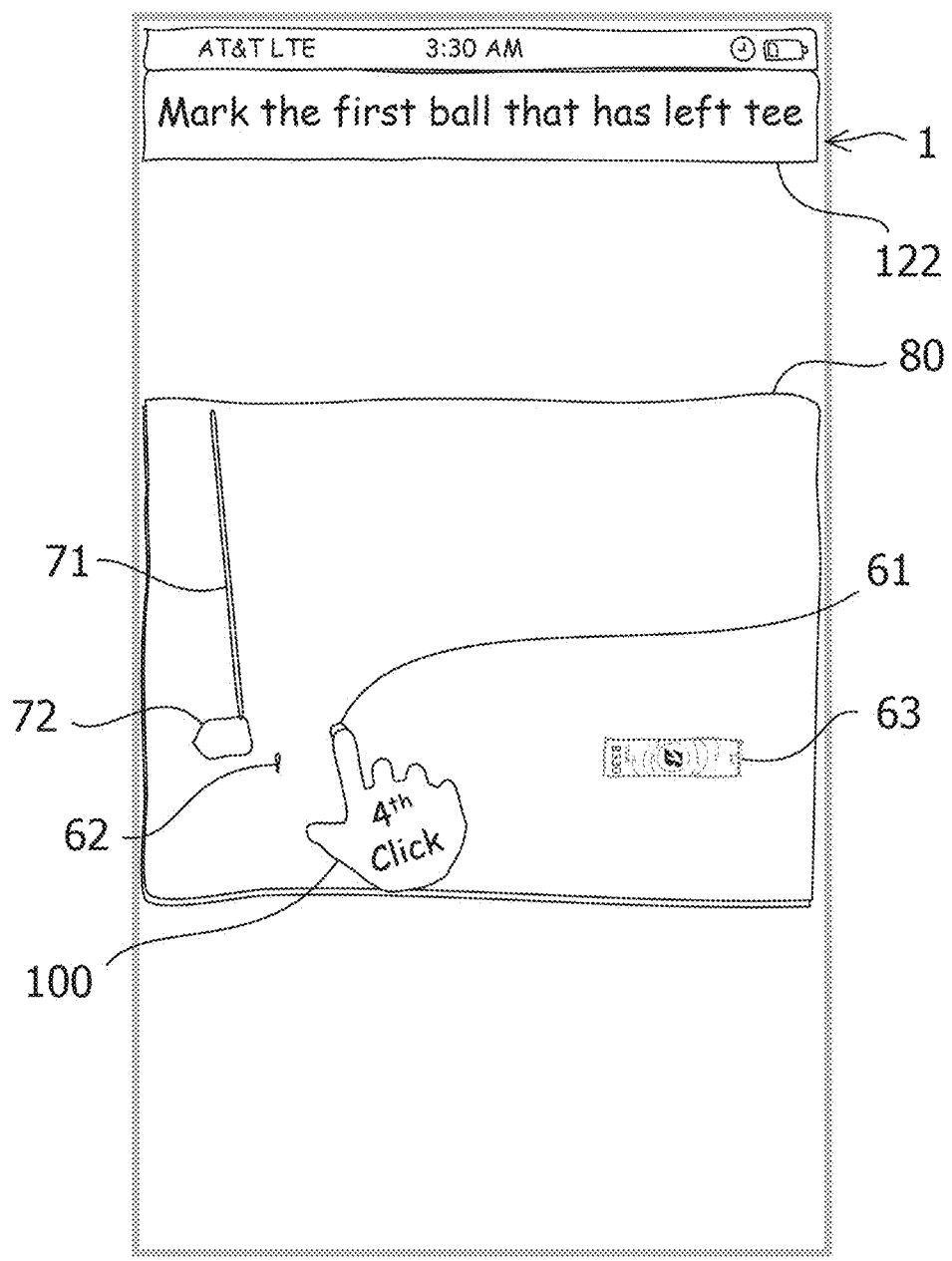
Figure 21:
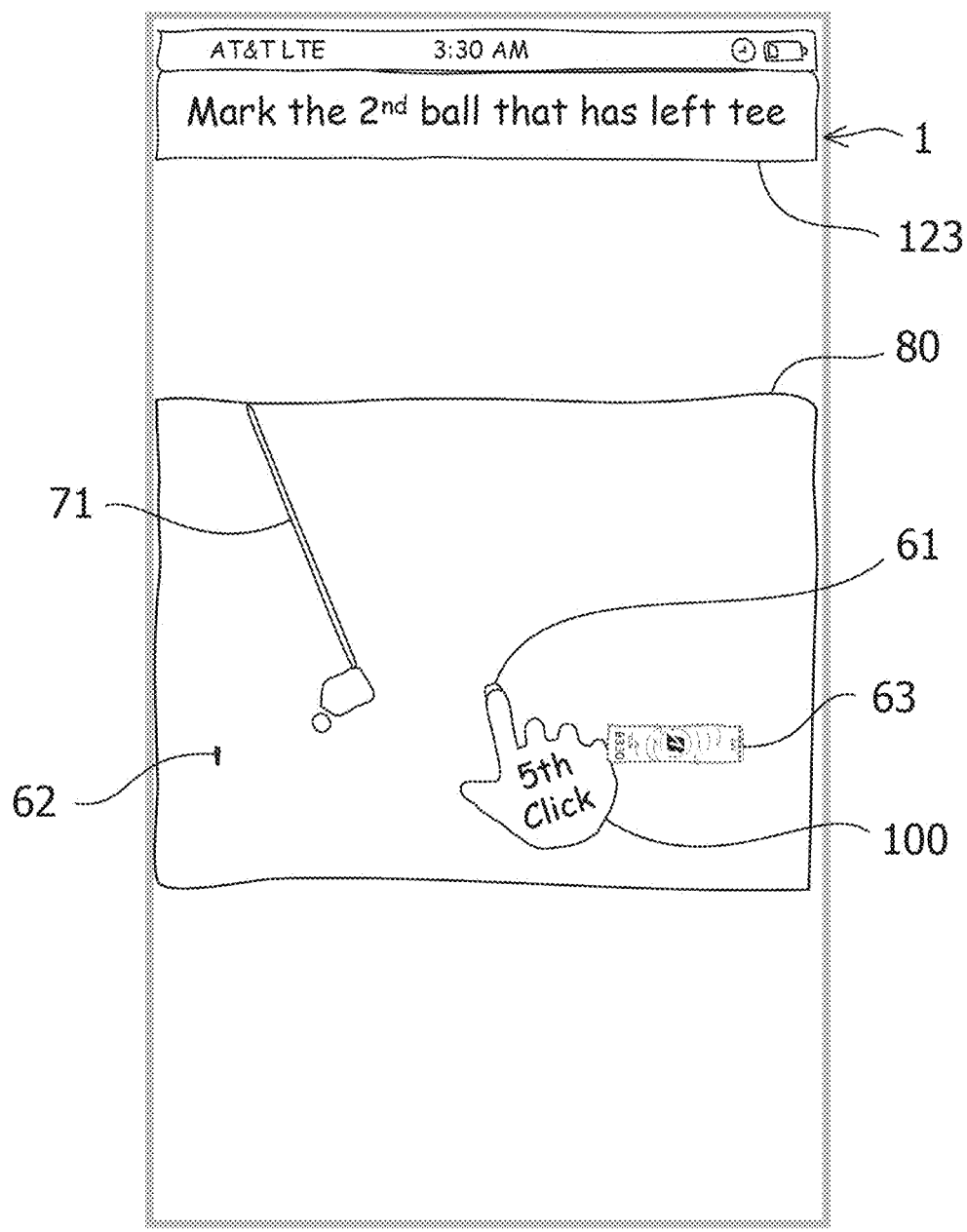

In the case of In-depth Ball Fitting, after the marking operation shown in FIGS. 15 and 15, another marking operation is performed to accurately determine an initial velocity and launch angel of the hit golf ball from the shot moving image. When the CPU reads the data of the shot moving image, as shown in FIG. 19, another playback of the shot moving image 80 is performed on the touch panel 1. As shown in FIGS. 19 to 21, further three frames in the shot moving image are tapped or clicked by the operator 100. The third click is to mark the golf ball 61 on the tee 62 (FIG. 19). The fourth click is to mark the first golf ball 61 that has left the tee 62 (FIG. 20). The fifth click is to mark the second golf ball 61 that has further left the tee 62 (FIG. 21).

According to the computer program, the CPU computes a trajectory of the hit golf ball from the shot moving image based on the calibration to determine a flight distance of the ball per a time (second) immediately after the impact, i.e., an initial velocity, and an elevation angle of the golf ball with respect to the horizontal line immediately after impact, i.e., a launch angle. The information of the determined initial velocity and launch angle is sent to the data storage unit and is stored therein.

Figure 22:
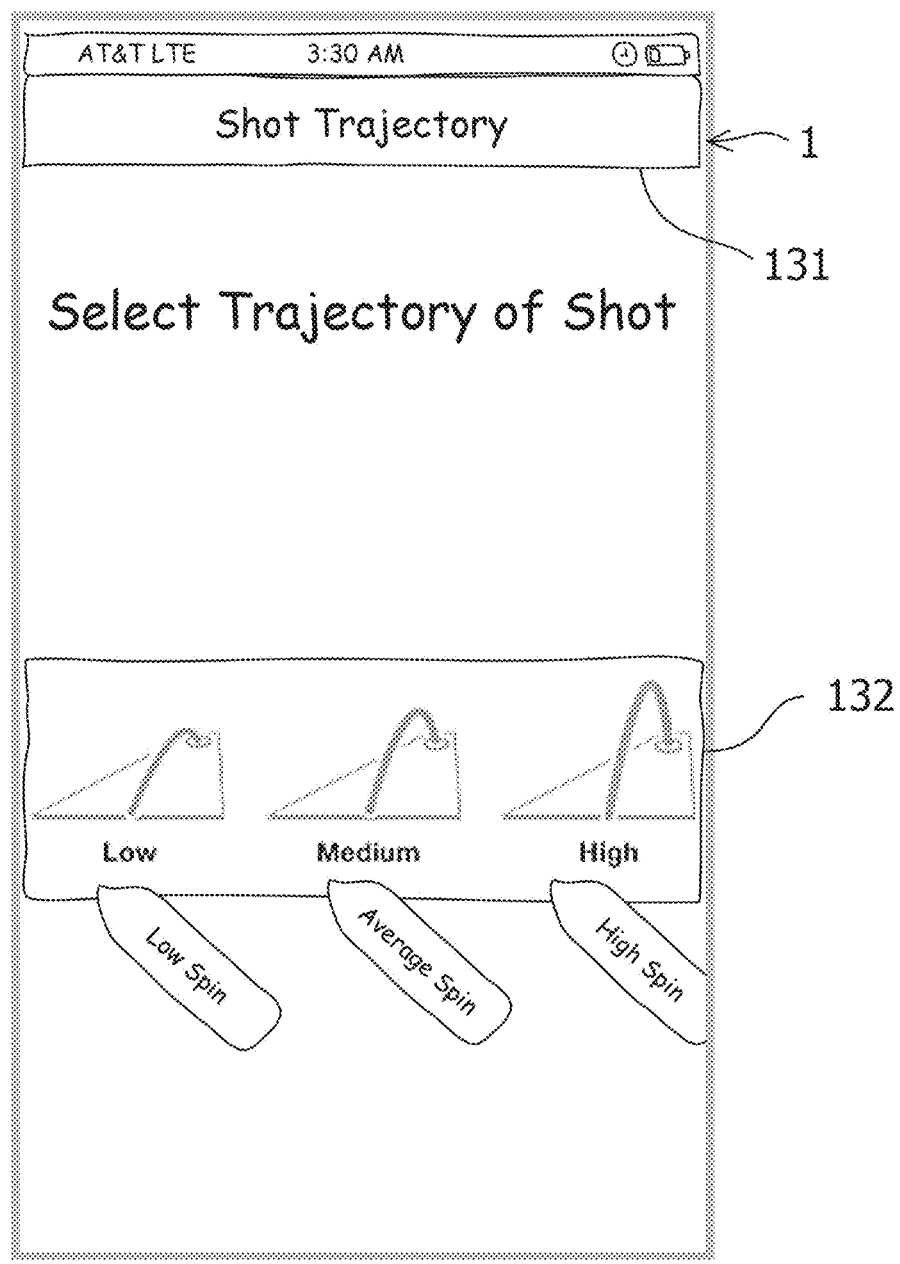
FIGS. 22 and 23 are views showing the display when information concerning an observation on the hit golf ball is input to the device in the embodiment of the method according to the present invention.
Figure 23:
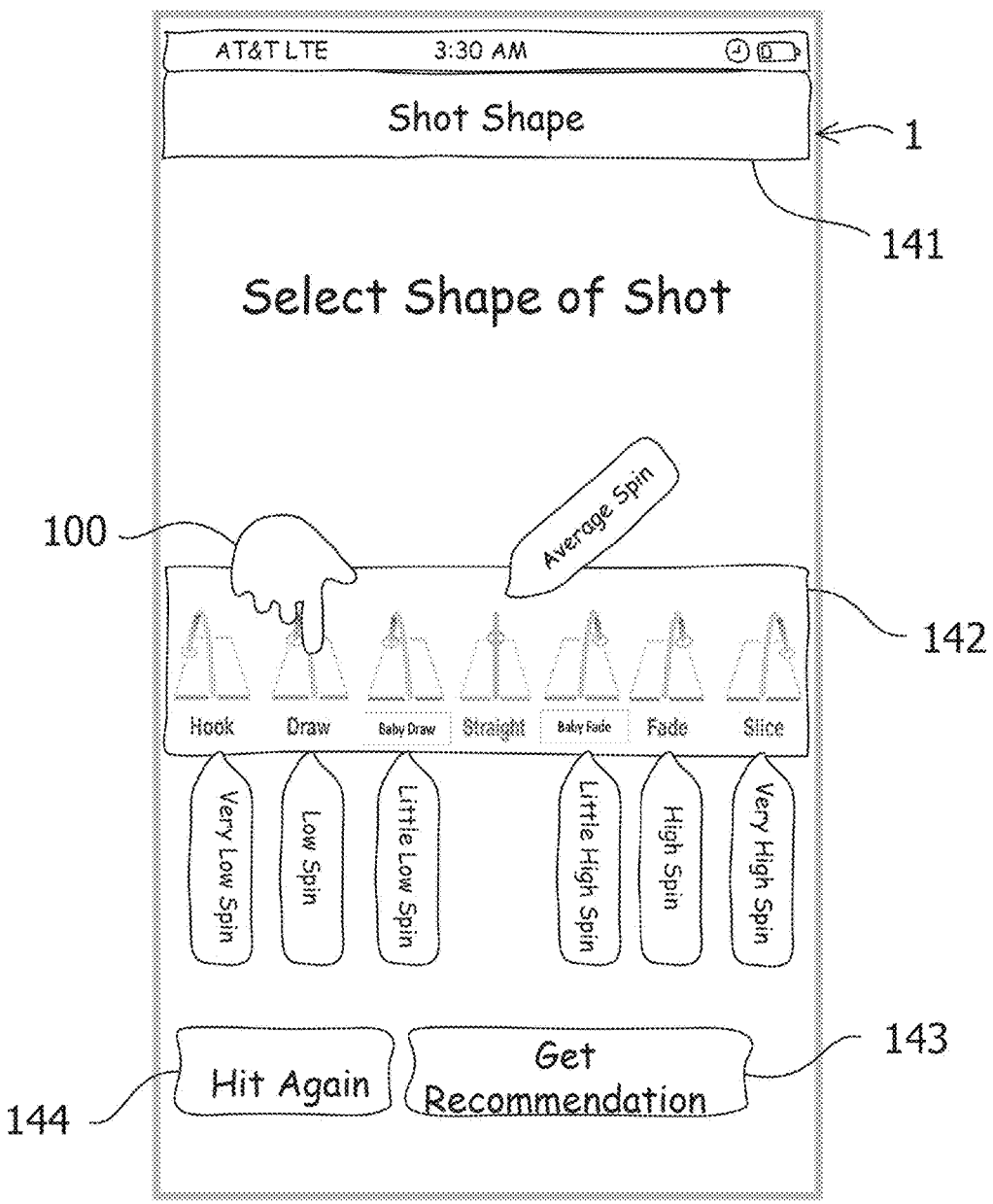

In addition, as shown in FIGS. 22 and 23, the information concerning an observation on the hit golf ball may be input to the device. The information concerning observation includes, but is not limited to, a selection from the group of a shot trajectory and/or a selection from the group of a shot shape. The group of a shot trajectory may consist of "Low," "Medium," and "High" trajectories. The low trajectory means a low spin of the hit golf ball, the medium trajectory meaning an average spin, the high trajectory meaning a high spin. The group of a shot shape may consist of hook, straight and slice, preferably of hook, draw, straight, fade and slice, more preferably of hook, draw, baby draw, straight, baby fade, fade, and slice. The "hook" means a very low spin of the hit golf ball, the "draw" meaning a low spin, the "baby draw" meaning a little low spin, the "straight" meaning an average spin, The "baby fade" meaning a little low spin, the "fade" meaning a high spin, the "slice" meaning a very high spin.

The CPU reads the database, the input information concerning the subject and the hitting skills thereof, the determined head speed, the determined initial velocity, the determined launch angle, and the input information concerning the observation on the hit golf ball stored in the data storage unit. The CPU specifies one golf ball product having a suitable performance for the subject from the database based on the read information mentioned above.

The CPU may specify a carry distance of the golf ball hit by the subject from the database based on the input information concerning the subject and the hitting skills thereof, the determined head speed, the determined initial velocity, the determined launch angle, and the input information concerning the observation on the hit golf ball stored in the data storage unit.

The CPU may specify a total distance of the golf ball hit by the subject from the database based on the input information concerning the subject and the hitting skills thereof, the determined head speed, the determined initial velocity, the determined launch angle, and the input information concerning the observation on the hit golf ball stored in the data storage unit.

Figure 24:
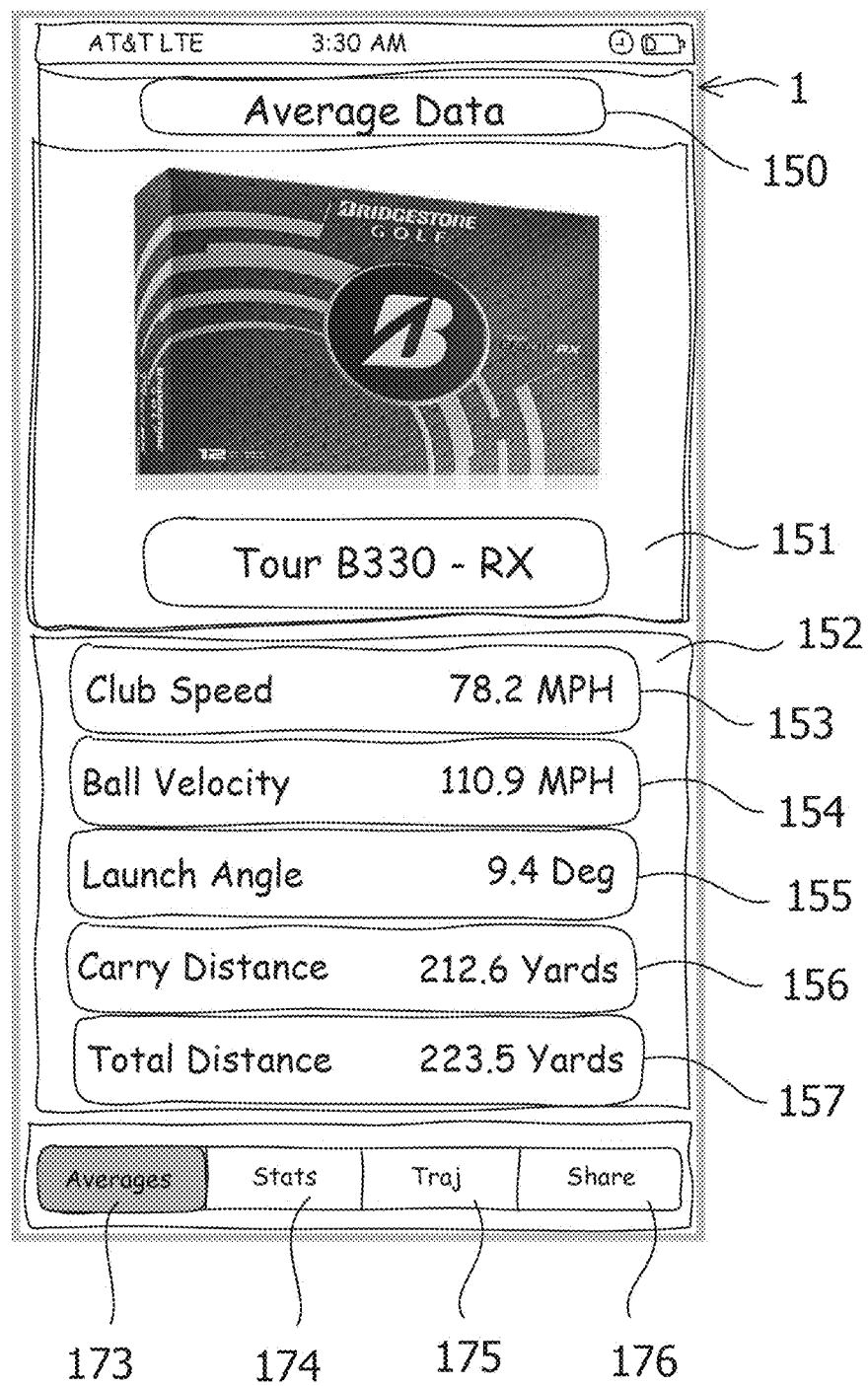
FIGS. 24 and 25 are views showing the display when information concerning a golf ball product having a suitable performance is provided to the subject by In-depth Ball Fitting in the embodiment of the method according to the present invention.

When a button 143 for "Get Recommendation" is tapped on the screen shown in FIG. 23, as shown in FIG. 24, the touch panel 1 displays a product name of the specified golf ball product having a suitable performance for the subject 151, the average club head speed 153, the average initial velocity 154, the average launch angle 155, the average carry distance 156, and the average total distance 157.

Figure 25:
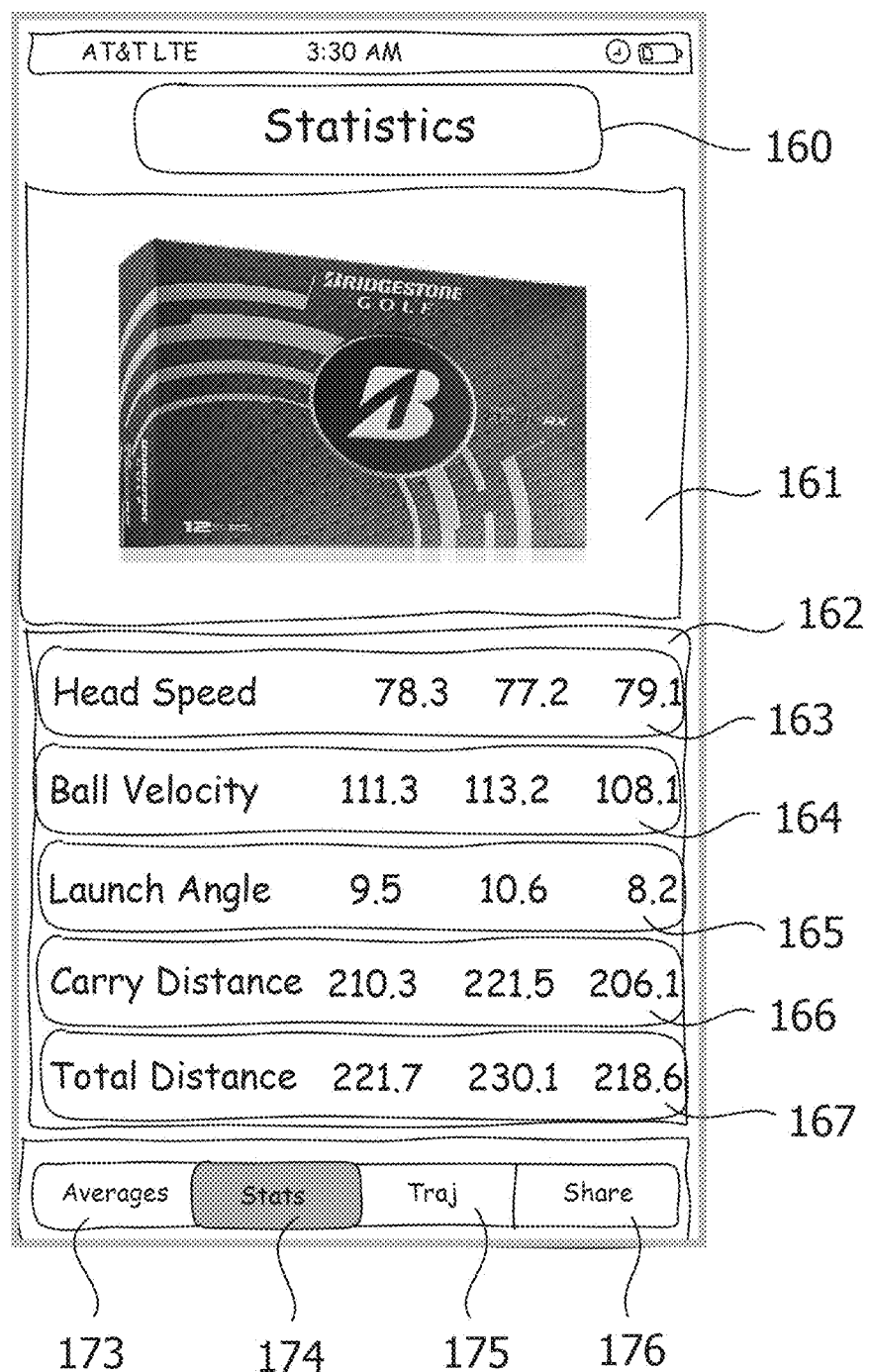
Figure 26:
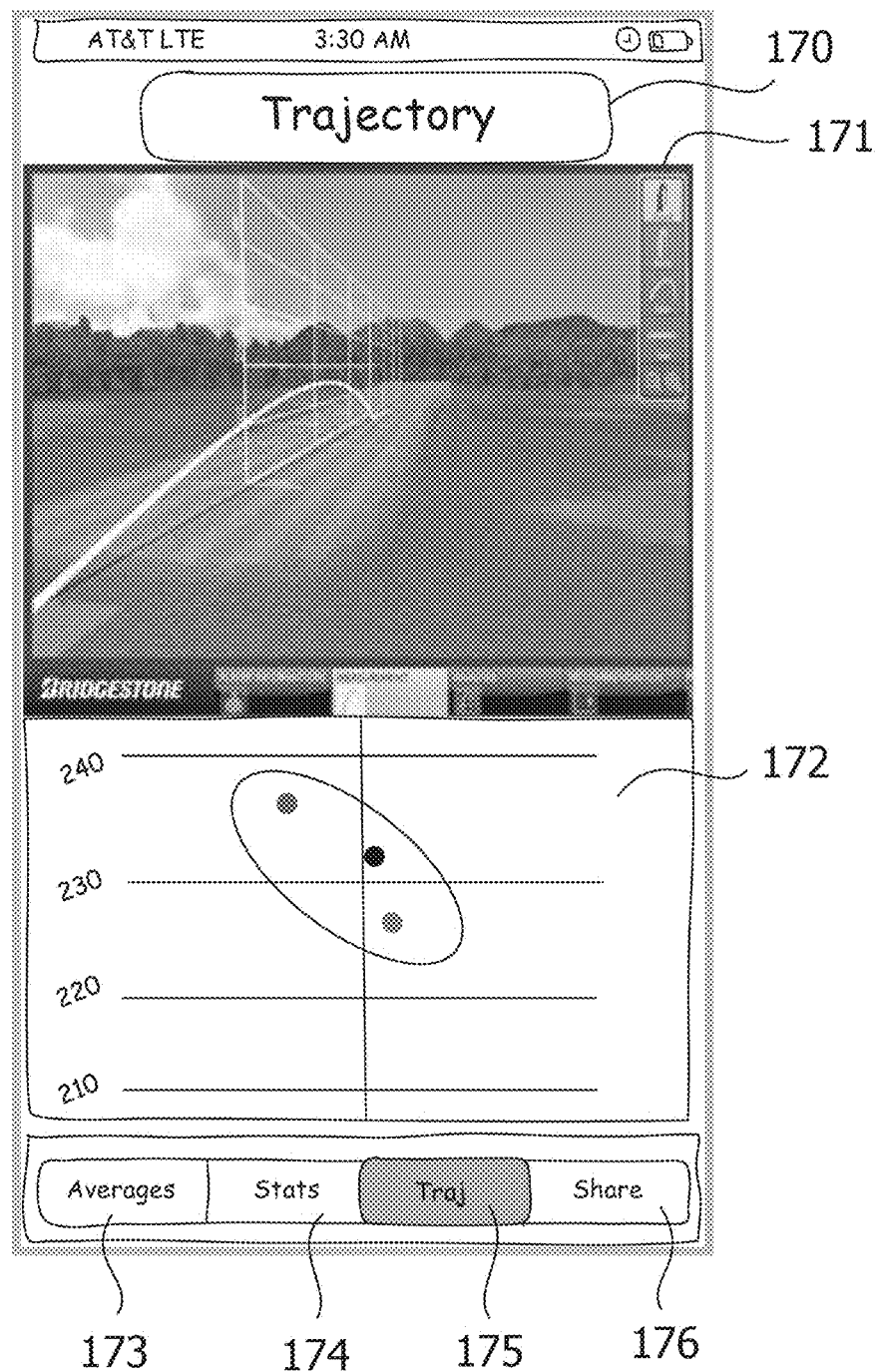
FIG. 26 is a view showing the display when a trajectory of the golf ball hit by the subject is represented in the embodiment of the method according to the present invention.

Also, as shown in FIG. 25, the touch panel 1 displays the determined club head speeds 163, the specified initial velocities 164, the specified launch angles 165, the specified carry distances 166, and the specified total distances 167 based on the records for the past three times as well as the product name of the specified golf ball product 161.

When a tab button 175 for "Traj" is tapped, a trajectory of the golf ball hit by the subject is visually represented on an upper screen 171 of the touch panel 1. In addition, the results of the hit golf balls based on the records for the past three times are plotted in a lower graph 172 showing total distance on the vertical axis and direction of ball on the horizontal axis.

A button 144 for "Hit Again" is tapped on the screen shown in FIG. 23 to return the screen shown in FIG. 11 for shooting a new moving image by the camera when the subject hits a golf ball again without displaying the screens of "Average Data" and "Statistics" shown in FIGS. 24 and 25.

Second Embodiment

A computer program product according this embodiment includes another database, which also is formed by storing past results of selecting an appropriate golf ball for a great number of people. The database includes data of information concerning hitting skills of the great number of people, data of initial velocities and launch angles of the golf balls hit by the great number of people and measured by exclusive measuring instrument, data of information concerning observations on the hit golf balls, and data of performances of golf ball products, which are correlated with each other. The database is stored in the data storage unit.

The information concerning a hitting skill may be, but is not limited to, a handicap, which is a numerical measure of a golfer's potential playing ability.

The information concerning an observation on the hit golf ball may be, but is not limited to, a selection from the group of a shot shape. The group of a shot shape may consist of hook, draw, straight, fade, and slice or may consist of hook, straight, and slice. The "hook" means a very low spin, the "draw" meaning a low spin, the "straight" meaning an average spin, the "fade" meaning a high spin, the "slice" meaning a very high spin.

The data of performances of golf ball products may be, but is not limited to, for example, a ball type selected from the group of consisting of solid type ball, soft type ball, distance type ball, low trajectory type ball, mid trajectory type ball, high trajectory type ball, low spin type ball, mid spin type ball, high spin type ball, and distance/spin type ball.

The database may further include data of head speeds of golf clubs when a great number of players hit golf balls, data of backspin rates of golf balls hit by a great number of players and measured by exclusive measuring instrument, data of carry distances of golf balls hit by a great number of players and measured by exclusive measuring instrument, and/or data of total distances of golf balls hit by the great number of players and measured by exclusive measuring instrument. These additional data are also correlated with the essential data mentioned above.

Any data in the database stored in the data storage unit of the mobile computer device may be changed freely or optionally by using updated data or added data through the network interface of the mobile computer device.

An embodiment of the method for selecting an appropriate golf ball using the mobile computer device having the configuration described above will be described below.

Figure 27:
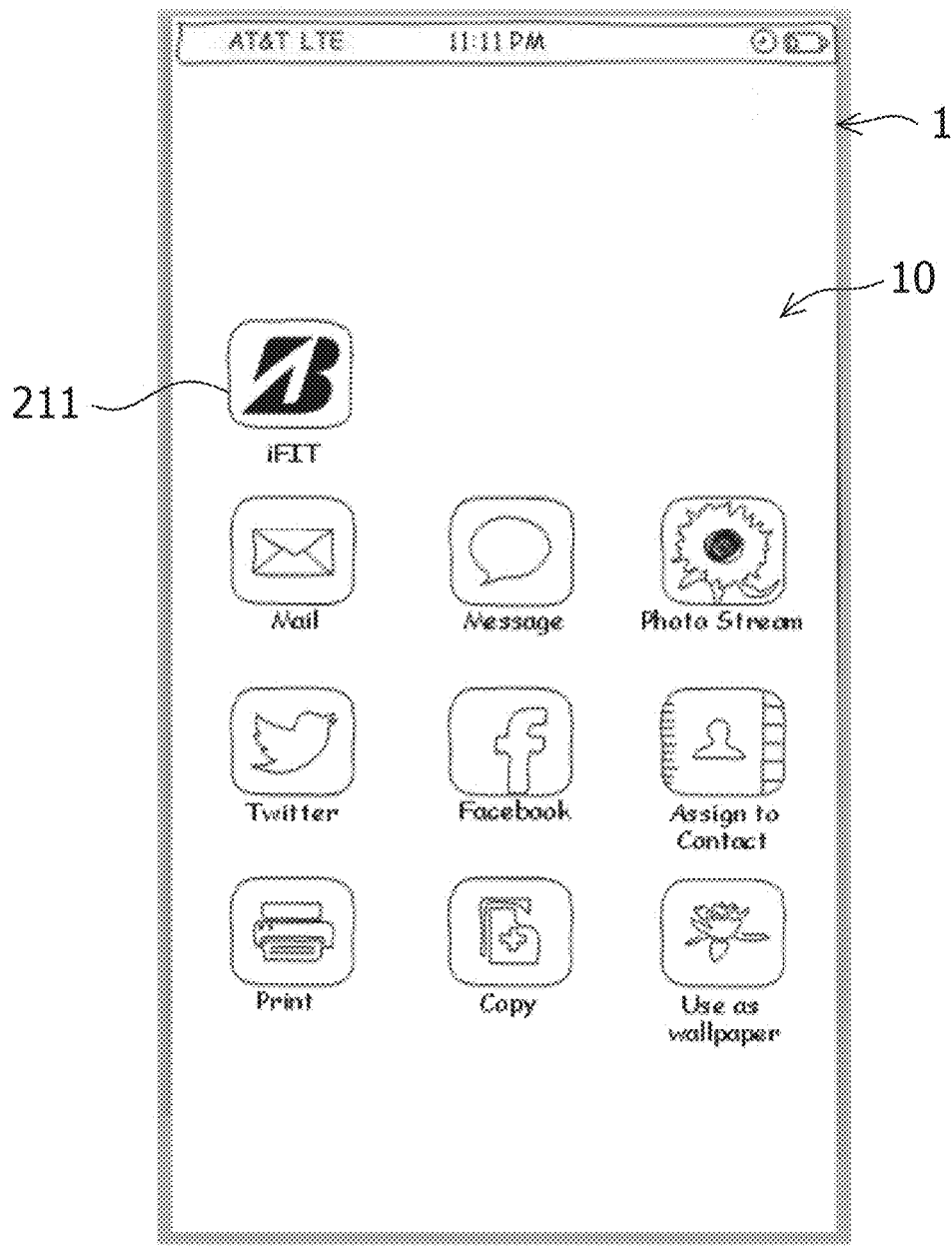
FIG. 27 is a view showing another display of a mobile computer device for another embodiment of a method according to the present invention.

As shown in FIG. 27, the touch panel 1 of the mobile computer device displays a standby screen 10, on which an icon 211, i.e., "iFIT," for starting the computer program of the present invention is placed as well as other icons. The icon 211 is tapped to start the computer program.

Figure 28:
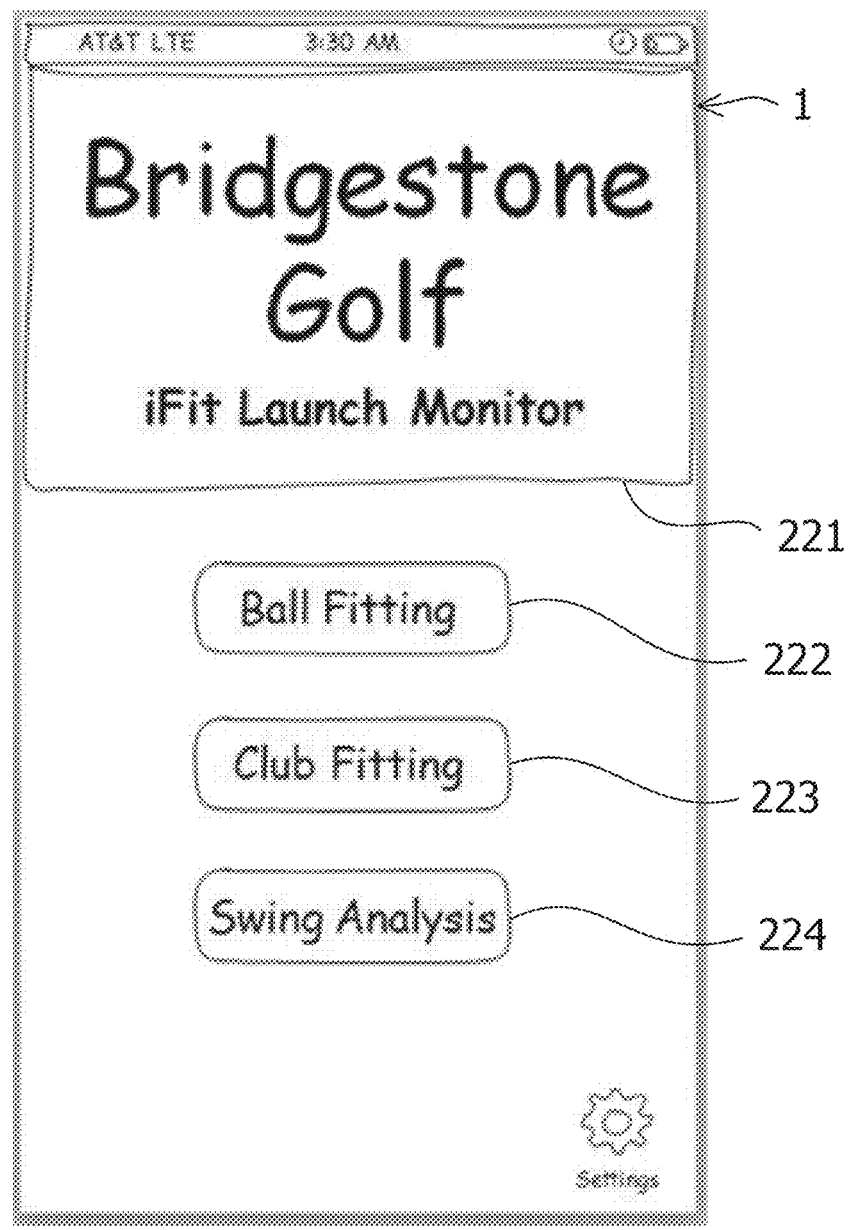
FIG. 28 is a view showing the display when another computer program starts up in the second embodiment of the method according to the present invention.

As shown in FIG. 28, when the computer program starts up, the touch panel 1 displays a program name 221, i.e., "Bridgestone Golf iFit Launch Monitor," and a button for ball fitting 222. The touch panel 1 also may display buttons for performing other courses, e.g., club fitting 223 and swing analysis 224, which are not described in the present specification. The button for ball fitting 222 is tapped to start the selecting an appropriate golf ball.

Figure 29:
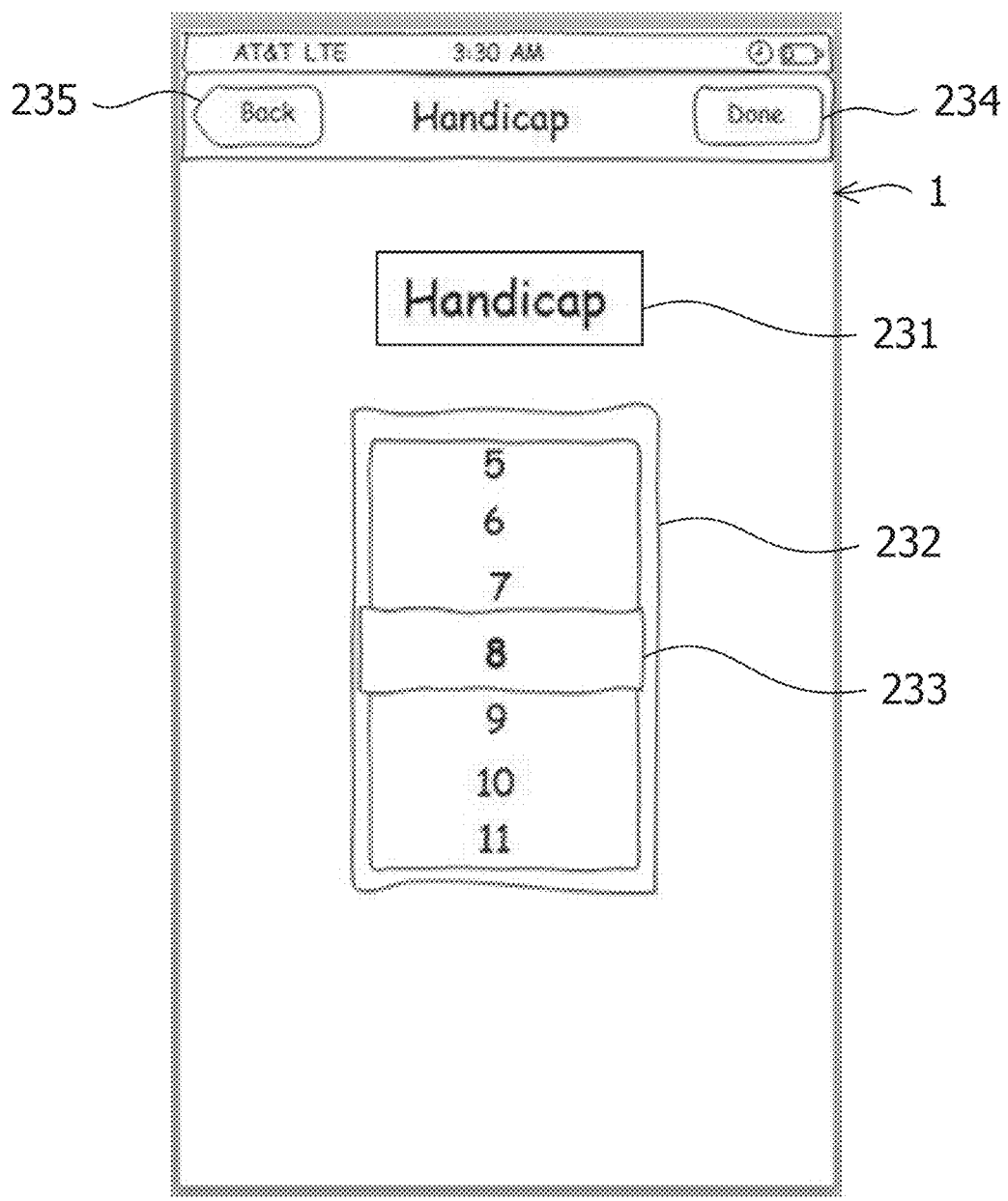
FIG. 29 is a view showing the display when information concerning a hitting skill of the subject is input to the device in the second embodiment of the method according to the present invention.
Figure 30:
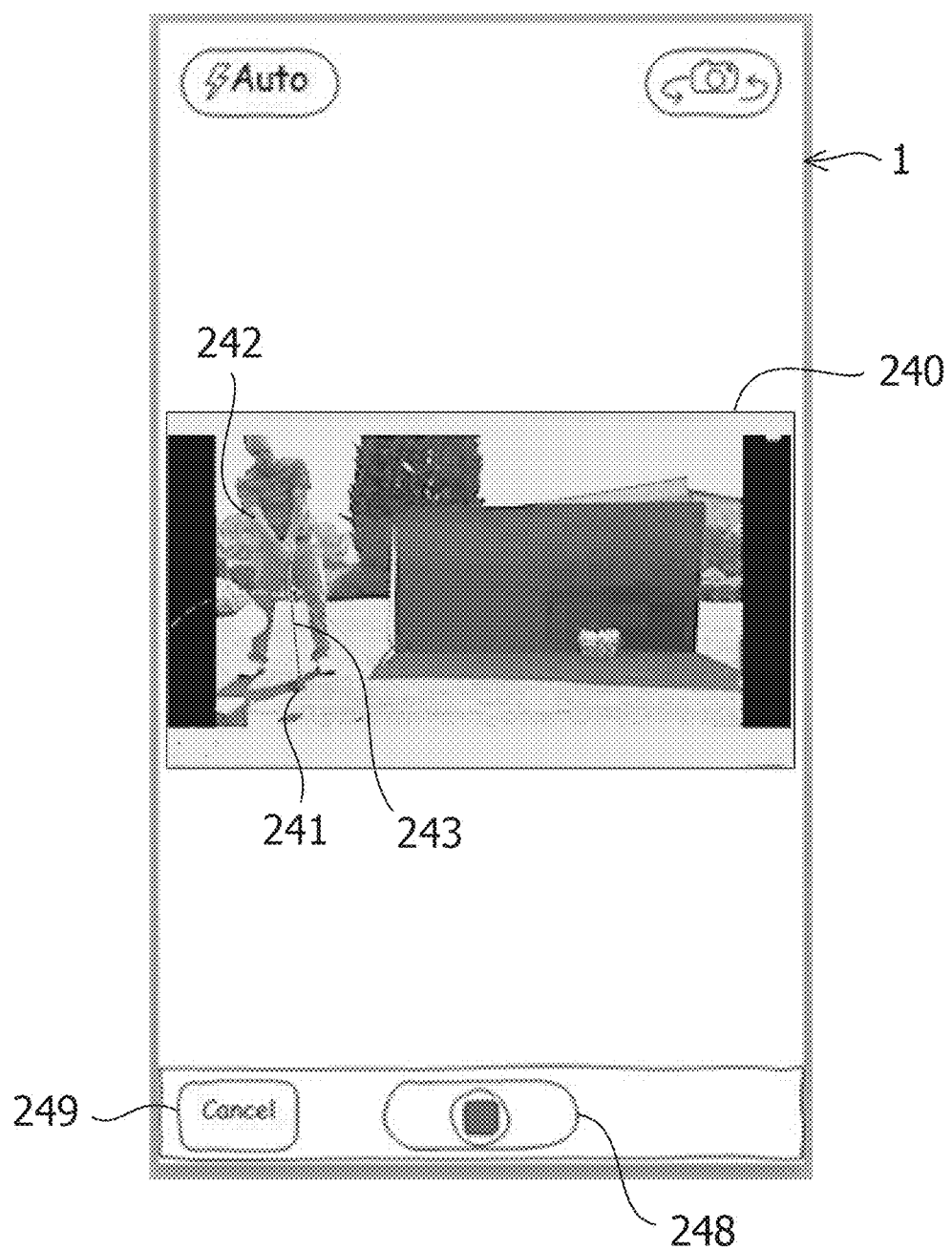
FIG. 30 is a view showing the display when the camera of the device shoots a moving image on a golf ball hit by the subject in the second embodiment of the method according to the present invention.

In the embodiment of the selecting an appropriate golf ball, first, the information concerning a hitting skill of a subject is input by the touch panel 1. As shown in FIG. 29, the touch panel 1 displays the name of information concerning a hitting skill 231, i.e., "Handicap" in the embodiment, and a pull-down menu 232 including a plurality of numbers to be chosen as a handicap of the subject. The subject drags or flicks the pull-down menu 232 so that a number showing the subject's handicap is located in a selection field 233. A "Done" button 234 displayed on an upper-right area of the screen is tapped to input a number located in the selection field 233 as the subject's handicap. The input information is sent from the touch panel 1 to the data storage unit and is stored therein. A "Back" button 235 displayed on an upper-left area of the screen is tapped to return to the previous screen.

After the information concerning hitting skill is input, a moving image is shot by the camera of the mobile computer device when the subject hits a golf ball. As shown in FIG.

30, the touch panel 1 shows a picture 240 photographed by the camera. On the picture 240, the subject 242 hits a golf ball 241 by a golf club 243. A moving image has to be shot at an angle and in a size sufficient to calculate an initial velocity and a launch angle of the golf ball 241 hit by the subject 242 from the shot moving image. For example, it is preferable for the shooting angle that a direction from the camera to the subject or the golf ball be perpendicular to a flying direction of the golf ball. It is preferable for the shooting size that the entire body or lower half body of the subject with the golf ball be contained within the picture 240 or an image frame.

Figure 31:
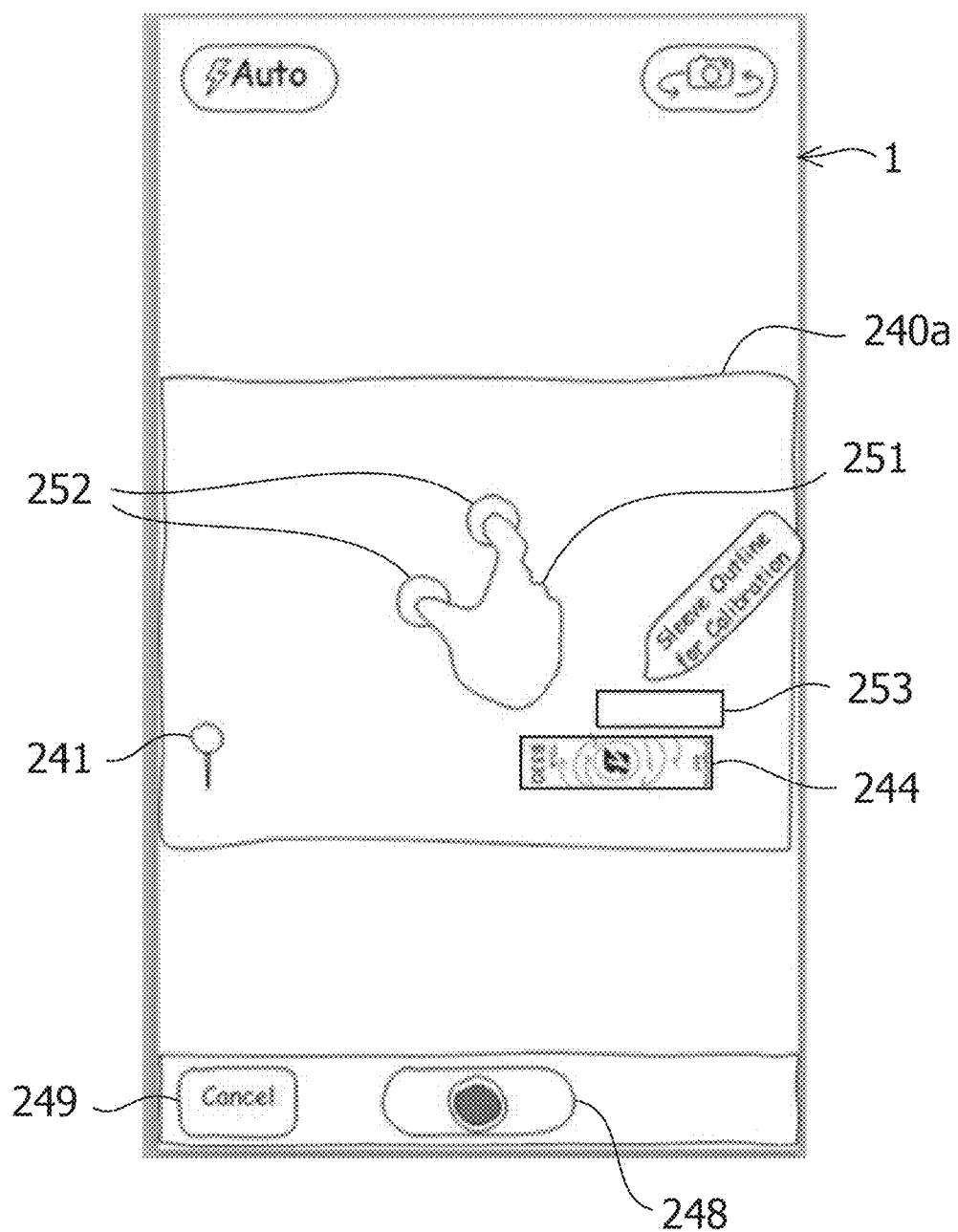
FIG. 31 is a view showing the display during a calibration of the shot moving image in the second embodiment of the method according to the present invention.

For the calibration described later in detail, as shown in FIG. 31, a sleeve box 244 for three golf balls is placed on the ground near the golf ball, which is supported by a golf tee off the ground, in order to contain the sleeve box 244 within the picture 240. The sleeve box 244 is preferably placed so that the longitudinal side thereof is parallel to the flying direction of the golf ball.

As shown in FIG. 31, a start/stop button 248 is tapped to shoot a moving image when the subject hits a golf ball. The information of the shot moving image is sent to the data storage unit and is stored therein. Shooting a moving image can be repeated any number of times. If a cancel button 249 is tapped, the last shot is deleted.

After shooting the moving image, a calibration is performed to accurately determine an initial velocity and a launch angle of the golf ball from the shot moving image. First, when the CPU reads the data of the shot moving image, a still image from the shot moving image is displayed in the touch panel. Next, as shown in FIG. 31, the moving image starts and stops by tapping the start/stop button 248 to display the still image 240a that the golf ball 241 and the sleeve box 244 are contained within the image frame before hitting the golf ball. The still image 240a is enlarged and reduced by pinch-out and pinch-in operations 252 of the operator's fingers 251 to fit the size of the sleeve box 244 to an outline for calibration 253 displayed on the still image 240a. A predetermined distance between two points (i.e., a known length of the sleeve box 244) and a horizontal line (i.e., a longitudinal edge of the sleeve box 244) in the shot moving image can be calibrated by these operations. The information concerning the calibration is sent to the CPU.

According to the computer program, the CPU computes a trajectory of the hit golf ball from the shot moving image based on the calibration to determine a flight distance of the ball per a time (second) immediately after impact, i.e., an initial velocity, and an elevation angle of the golf ball with respect to the horizontal line immediately after impact, i.e., a launch angle. The information of the determined initial velocity and launch angle is sent to the data storage unit and is stored therein.

Optionally, according to the computer program, the CPU may compute a rotation of a mark put on the surface of the golf ball from the shot moving image based on the calibration to determine a backspin rate and/or a sidespin rate of the hit golf ball. The information of the determined backspin and sidespin rates is sent to the data storage unit and is stored therein.

Optionally, according to the computer program, the CPU may measure a head speed of a golf club of the subject from the shot moving image based on the calibration. Alternatively, if the number of frames per second is less than 240 fps, the CPU may estimate the head speed by using the measured ball speed stored in the CPU and the quality of contact of the said shot. A quality of contact FACTOR will be assigned based on the quality of contact. The information of the measured or estimated head speed is sent to the data storage unit and is stored therein.

Figure 32:
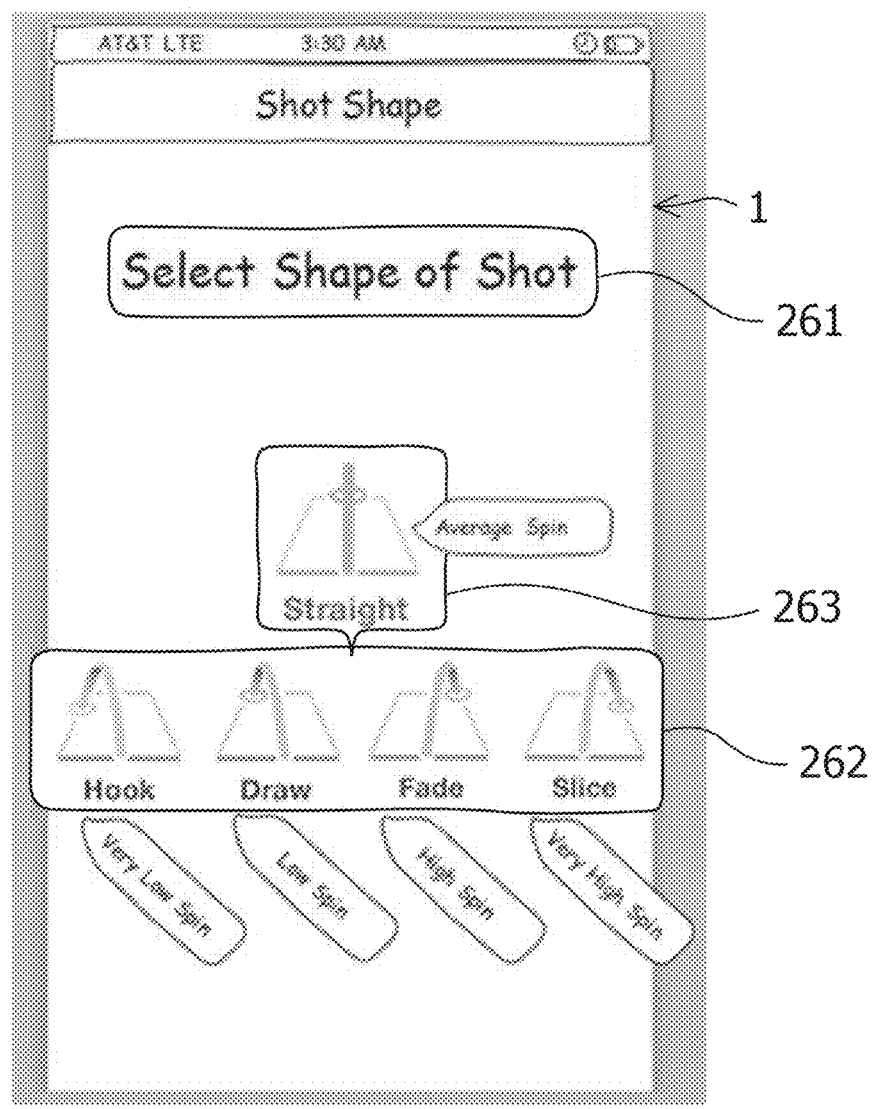
FIG. 32 is a view showing the display when information concerning an observation on the hit golf ball is input to the device in the second embodiment of the method according to the present invention.

After the calibration operations, the information concerning an observation of the golf ball hit by the subject is input by the touch panel. As shown in FIG. 32, the touch panel 1 displays the name of information concerning an observation on the hit golf ball 261, i.e., "Select Shape of a Shot" in the embodiment, and a pull-down menu 262 including a plurality of shot shapes to be chosen, for example, "hook," "draw," "straight," "fade," and "slice." The subject drags the pull-down menu 262 so that the most suitable one from the five shot shapes as the observed trajectory of the golf ball is located in a selection field 263. The selection field 263 is double tapped to input the shot shape displayed therein as the selected shot shape. The input information is sent from the touch panel 1 to the data storage unit and is stored therein.

After the information concerning the observation on the hit golf ball is input, the CPU reads the database, the input handicap and shot shape and the determined initial velocity and launch angle stored in the data storage unit. The CPU specifies one golf ball product having a suitable performance for the subject from the database based on the read information mentioned above.

The CPU may specify a head speed of golf club at impact of a golf ball from the database based on the input hitting skill (i.e., handicap) and the determined initial velocity and launch angle, whereas the CPU may measure or estimate the head speed.

The CPU may specify a backspin rate of the golf ball hit by the subject from the database based on the input observation on the hit golf ball (i.e., shot shape) and the determined initial velocity and launch angle, whereas the CPU may measure the back spin rate.

The CPU may specify a carry distance of the golf ball hit by the subject from the database based on the input hitting skill (i.e., handicap) and the determined initial velocity and launch angle.

The CPU may specify a total distance of the golf ball hit by the subject from the database based on the input hitting skill (i.e., handicap) and the determined initial velocity and launch angle.

Figure 33:
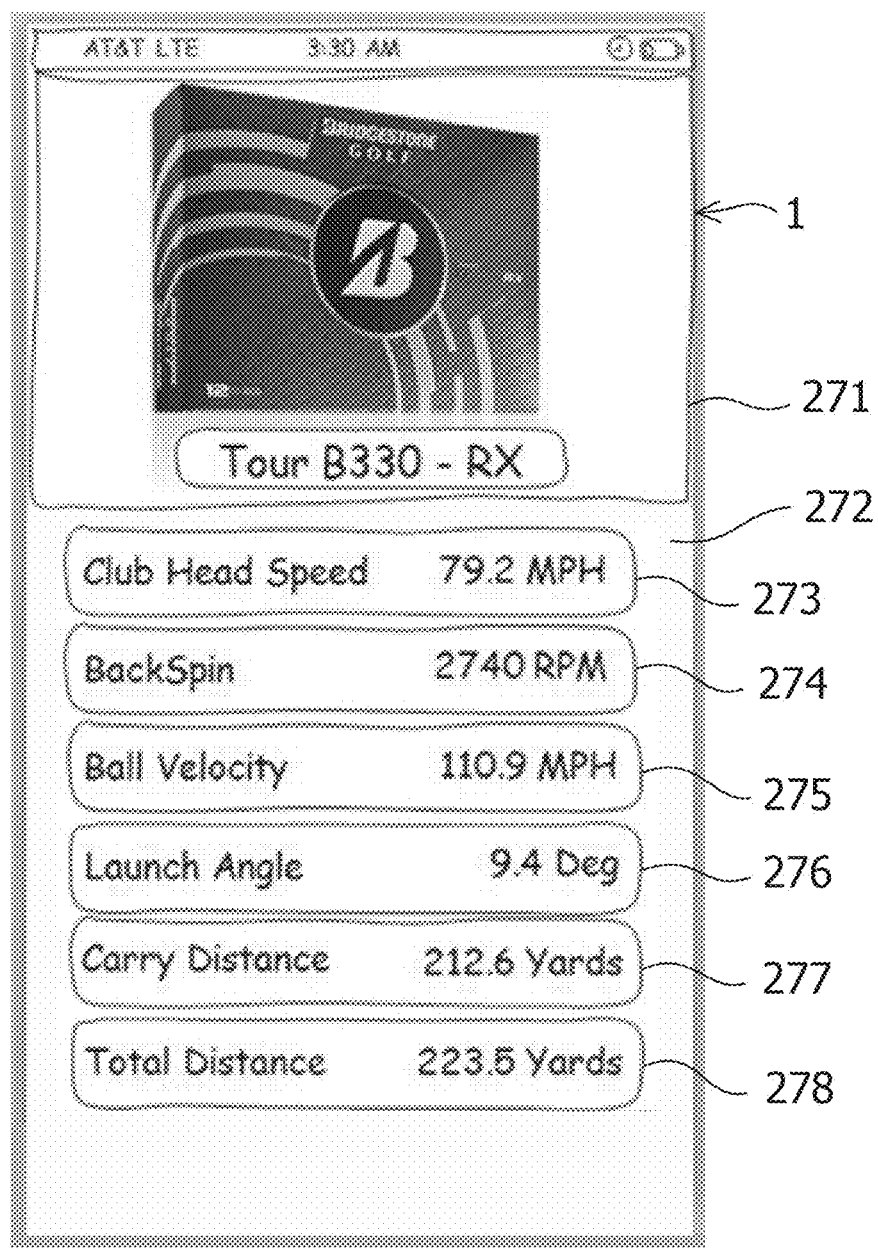
FIG. 33 is a view showing the display when information concerning a golf ball product having a suitable performance is provided to the subject in the second embodiment of the method according to the present invention.

After the information concerning the observation on the hit golf ball, as shown in FIG. 33, the CPU displays a product name of the specified golf ball product having a suitable performance for the subject 271, the measured, estimated or specified club head speed 273, the measured or specified backspin rate 274, the specified carry distance 277, and the specified total distance 278 on the touch panel 1. A photograph showing a package of the specified golf ball product having a suitable performance for the subject may be displayed as well as the product name by using the network interface. Also, the CPU displays the initial velocity 275 and the launch angle 276 determined from the moving image based on the calibration on the touch panel 1.

What is claimed is:

1. A method for selecting an appropriate golf ball for a subject by using a mobile computer device with a camera, the method comprising:
   inputting information concerning hitting skill of the subject to the mobile computer device;
   performing a calibration of a distance and/or direction between two points in a screen of the mobile computer for shooting a moving image by displaying a marking having a first predetermined length on a display screen of the mobile computer device and zooming the camera to until an item of a second predetermined length captured by the camera matches the first predetermined length;

shooting a moving image by the camera of the mobile computer device when the subject hits a golf ball by a golf club;

determining a head speed of the golf club before an impact of the club and the ball from the shot moving image based on the calibration;

computing a golf ball product having a suitable performance for the subject from the input information concerning hitting skill and the determined head speed, based on a database comprising data of information concerning hitting skills of players, data of head speeds before impact of club and ball, and data of performances of golf ball products which are correlated with each other; and displaying the computed recommended golf ball product on the mobile computer device.

2. The method according to claim 1, further comprising displaying the determined head speed on the mobile computer device.

3. The method according to claim 1, further comprising computing an initial velocity of the golf ball hit by the subject from the input information concerning hitting skill and the determined head speed based on the database, the database further comprising data of initial velocities of hit golf balls which are correlated with the other data; and displaying the computed initial velocity on the mobile computer device.

4. The method according to claim 1, further comprising computing a launch angle of the golf ball hit by the subject from the input information concerning hitting skill and the determined head speed based on the database, the database further comprising data of launch angles of hit golf balls which are correlated with the other data; and displaying the computed launch angle on the mobile computer device.

5. The method according to claim 1, further comprising computing a carry distance of the hit golf ball from the input information concerning hitting skill and the determined head speed based on the database, the database further comprising data of carry distances of hit golf ball which are correlated with the other data; and displaying the computed carry distance on the mobile computer device.

6. The method according to claim 1, further comprising computing a total distance of the hit golf ball from the input information concerning hitting skill and the determined head speed based on the database, the database further comprising data of total distances of hit golf ball which are correlated with the other data; and displaying the computed total distance on the mobile computer device.

7. The method according to claim 1, wherein the information concerning hitting skill comprises an average score or average driver distance.

8. The method according to claim 1, wherein the information concerning hitting skill comprises a normal shot shape selected from the group consisting of hook, draw, baby draw, straight, baby fade, fade, and slice.

9. The method according to claim 1, wherein the information concerning hitting skill comprises a normal shot height selected from the group consisting of low, medium, and high.

10. The method according to claim 1, wherein the two points in the shot moving image for the calibration are opposite ends of a sleeve box for golf balls in the shot moving image along a longitudinal direction thereof.

11. The method according to claim 1, further comprising:

determining an initial velocity and a launch angle of the golf ball hit by the subject from the shot moving image based on the calibration; and inputting information concerning an observation of the golf ball hit by the subject to the mobile computer device, wherein the computing step is carried out by computing a golf ball product having a suitable performance for the subject from the input information concerning hitting skill, the determined head speed, the determined initial velocity, the determined launch angle, and the input information concerning observation, based on the database further comprising data of initial velocities of hit golf balls, data of launch angles of hit golf balls, and data of information concerning observations of hit golf balls which are correlated with the other data.

12. The method according to claim 11, wherein the information concerning observation of the hit golf ball comprises a trajectory of a shot selected from the group consisting of low, medium, and high.

13. The method according to claim 11, wherein the information concerning observation of the hit golf ball comprises a shape of a shot selected from the group consisting of hook, draw, baby draw, straight, baby fade, fade, and slice.

14. The method according to claim 11, further comprising displaying the determined initial velocity and the determined launch angle on the mobile computer device.

15. A nonvolatile computer program product for selecting an appropriate golf ball for a subject, the nonvolatile computer program product being configured to be stored in a mobile computer device with a camera and having computer program instructions to be executed by the mobile computer device, the instructions comprising:

determining a head speed of a golf ball hit by the subject from a moving image shot by the camera of the mobile computer device when the subject hits the golf ball, based on a calibration of a distance and/or direction between two points in a screen of the mobile computer device for shooting the moving image, the calibration being performed by displaying a marking having a first predetermined length on a display screen of the mobile computer device and zooming the camera to until an item of a second predetermined length captured by the camera matches the first predetermined length;

computing a golf ball product having a suitable performance for the subject from information concerning hitting skill of the subject input to the mobile computer device, and the determined head speed, based on a database comprising data of information concerning hitting skills of players, data of head speeds of hit golf balls, and data of performances of golf ball products which are correlated with each other; and displaying the computed recommended golf ball product on the mobile computer device.

16. The nonvolatile computer program product according to claim 15, wherein the instructions further comprise displaying the determined head speed of the golf ball on the mobile computer device.

17. The nonvolatile computer program product according to claim 15, wherein the instructions further comprise computing an initial velocity of the hit golf ball from the input information concerning hitting skill and the determined head speed, based on the database, the database further comprising data of initial velocities of hit golf balls which are correlated with the other data; and displaying the computed initial velocity on the mobile computer device.

18. The nonvolatile computer program product according to claim 15, wherein the instructions further comprise computing a launch angle of the hit golf ball from the input information concerning hitting skill and the determined head speed, based on the database, the database further comprising data of launch angles of hit golf balls which are correlated with other data; and displaying the computed launch angle on the mobile computer device.

19. The nonvolatile computer program product according to claim 15, wherein the instructions further comprise computing a carry distance of the hit golf ball from the input information concerning hitting skill and the determined head speed, based on the database, the database further comprising data of carry distances of hit golf balls which are correlated with other data; and displaying the computed carry distance on the mobile computer device.

20. The nonvolatile computer program product according to claim 15, wherein the instructions further comprise computing a total distance of the hit golf ball from the input information concerning hitting skill and the determined head speed, based on the database, the database further comprising data of total distances of hit golf balls which are correlated with other data; and displaying the computed total distance on the mobile computer device.

21. The nonvolatile computer program product according to claim 15, wherein the information concerning hitting skill comprises an average score or average driver distance.

22. The nonvolatile computer program product according to claim 15, wherein the information concerning hitting skill comprises a normal shot shape selected from the group consisting of hook, draw, baby draw, straight, baby fade, fade, and slice.

23. The nonvolatile computer program product according to claim 15, wherein the information concerning hitting skill comprises a normal shot height selected from the group consisting of low, medium, and high.

24. The nonvolatile computer program product according to claim 15, wherein the two points in the shot moving image for the calibration are opposite ends of a sleeve box for golf balls in the shot moving image along a longitudinal direction thereof.

25. The nonvolatile computer program product according to claim 15, wherein the instructions further comprise determining an initial velocity and a launch angle of the golf ball hit by the subject from the shot moving image based on the calibration, and
wherein the computing step is carried out by computing a golf ball product having a suitable performance for the subject from the input information concerning hitting skill, the determined head speed, the determined initial velocity, the determined launch angle, and information concerning an observation of the golf ball hit by the subject input to the mobile computer device, based on the database further comprising data of initial velocities of hit golf balls, data of launch angles of hit golf balls, and data of information concerning observations of hit golf balls which are correlated with the other data.

26. The nonvolatile computer program product according to claim 25, wherein the information concerning observation of the hit golf ball comprises a trajectory of a shot selected from the group consisting of low, medium, and high.

27. The nonvolatile computer program product according to claim 25, wherein the information concerning observation of the hit golf ball comprises a shape of a shot selected from the group consisting of hook, draw, baby draw, straight, baby fade, fade, and slice.

28. The nonvolatile computer program product according to claim 25, wherein the instructions further comprise displaying the determined initial velocity and the determined launch angle on the mobile computer device.

29. A method for selecting an appropriate golf ball for a subject by using a mobile computer device with a camera, the method comprising:
inputting information concerning hitting skill of the subject to the mobile computer device;
shooting a moving image by the camera of the mobile computer device when the subject hits a golf ball;
performing a calibration of a distance and/or direction between two points in the shot moving image by displaying a marking having a first predetermined length on a display screen of the mobile computer device and zooming the camera to until an item of a second predetermined length captured by the camera matches the first predetermined length;
determining an initial velocity and a launch angle of the golf ball hit by the subject from the shot moving image based on the calibration;
inputting information concerning an observation of the golf ball hit by the subject to the mobile computer device; and
computing a golf ball product having a suitable performance for the subject from the input information concerning the hitting skill and the observation and the determined initial velocity and launch angle, based on a database comprising data of information concerning hitting skills of players, initial velocities and launch angles of hit golf balls, information concerning observations of hit golf balls, and performances of golf ball products which are correlated with each other; and
displaying the computed recommended golf ball product on the mobile computer device.

30. The method according to claim 29, further comprising displaying the determined initial velocity and launch angle of the golf ball on the mobile computer device.

31. The method according to claim 29, further comprising computing a head speed of golf club of the subject from the input information concerning the hitting skill and the determined initial velocity and launch angle based on the database, the database further comprising data of head speeds of a golf club which are correlated with other data; and
displaying the computed head speed on the mobile computer device.

32. The method according to claim 29, further comprising computing a backspin of the hit golf ball from the input information concerning the observation of the hit golf ball and the determined initial velocity and launch angle based on the database, the database further comprising data of backspins of hit golf balls which are correlated with the other data; and displaying the computed backspin on the mobile computer device.

33. The method according to claim 29, further comprising computing a carry distance of the hit golf ball from the input information concerning the hitting skill and the determined initial velocity and launch angle based on the database, the database further comprising data of carry distances of hit golf ball which are correlated with the other data; and displaying the computed carry distance on the mobile computer device.

34. The method according to claim 29, further comprising computing a total distance of the hit golf ball from the input information concerning the hitting skill and the determined initial velocity and launch angle based on the database, the database further comprising data of total distances of hit golf ball which are correlated with the other data; and displaying the computed total distance on the mobile computer device.

35. The method according to claim 29, wherein the information concerning the hitting skill is a handicap.

36. The method according to claim 29, wherein the information concerning the observation on the hit golf ball is a selection from the group consisting of hook, draw, straight, fade, and slice.

37. The method according to claim 29, wherein the two points in the shot moving image for the calibration are opposite ends of a sleeve box for golf balls in the shot moving image along a longitudinal direction thereof.

38. The method according to claim 29, further comprising determining a backspin of the golf ball hit by the subject from the shot moving image based on the calibration; and displaying the determined backspin on the mobile computer device.

39. The method according to claim 29, further comprising determining a head speed of a golf club of the subject from the shot moving image based on the calibration; and displaying the determined head speed on the mobile computer device.

40. A nonvolatile computer program product for selecting an appropriate golf ball, the nonvolatile computer program product being configured to be stored in a mobile computer device with a camera and having computer program instructions to be executed by the mobile computer device, the instructions comprising:
   determining an initial velocity and a launch angle of a golf ball hit by a subject from a moving image shot by the camera of the mobile computer device when the subject hits the golf ball, based on a calibration of a distance and/or direction between two points in the shot moving image, the calibration being performed by displaying a marking having a first predetermined length on a display screen of the mobile computer device and zooming the camera to until an item of a second predetermined length captured by the camera matches the first predetermined length;
   computing a golf ball product having a suitable performance for the subject from information concerning a hitting skill of the subject and an observation on the golf ball hit by the subject input to the mobile computer device, and the determined initial velocity and launch angle, based on a database comprising data of information concerning hitting skills of players, initial velocities and launch angles of hit golf balls, information concerning observations of hit golf balls, and performances of golf ball products which are correlated with each other; and
   displaying the computed recommended golf ball product on the mobile computer device.

41. The nonvolatile computer program product according to claim 40, wherein the instructions further comprise displaying the determined initial velocity and launch angle of the golf ball on the mobile computer device.

42. The nonvolatile computer program product according to claim 40, wherein the instructions further comprise computing a head speed of golf club of the subject from the input information concerning the hitting skill and the determined initial velocity and launch angle based on the database, the database further comprising data of head speeds of golf club which are correlated with the other data; and displaying the computed head speed on the mobile computer device.

43. The nonvolatile computer program product according to claim 40, wherein the instructions further comprise computing a backspin rate of the hit golf ball from the input information concerning the observation of the hit golf ball and the determined initial velocity and launch angle based on the database, the database further comprising data of backspin rates of hit golf balls which are correlated with other data; and displaying the computed backspin rate on the mobile computer device.

44. The nonvolatile computer program product according to claim 40, wherein the instructions further comprise computing a carry distance of the hit golf ball from the input information concerning the hitting skill and the determined initial velocity and launch angle based on the database, the database further comprising data of carry distances of hit golf ball which are correlated with other data; and displaying the computed carry distance on the mobile computer device.

45. The nonvolatile computer program product according to claim 40, wherein the instructions further comprise computing a total distance of the hit golf ball from the input information concerning the hitting skill and the determined initial velocity and launch angle based on the database, the database further comprising data of total distances of hit golf ball which are correlated with other data; and displaying the computed total distance on the mobile computer device.

46. The nonvolatile computer program product according to claim 40, wherein the information concerning the hitting skill is a handicap.

47. The nonvolatile computer program product according to claim 40, wherein the information concerning the observation on the hit golf ball is selected from the group consisting of hook, draw, straight, fade, and slice.

48. The nonvolatile computer program product according to claim 40, wherein the two points in the shot moving image for the calibration are opposite ends of a sleeve box for golf balls in the shot moving image along a longitudinal direction thereof.

49. The nonvolatile computer program product according to claim 40, wherein the instructions further comprise determining a backspin rate of the golf ball hit by the subject from the shot moving image based on the calibration; and displaying the determined backspin rate on the mobile computer device.

50. The nonvolatile computer program product according to claim 40, wherein the instructions further comprise determining a head speed of a golf club of the subject from the shot moving image based on the calibration; and displaying the determined head speed on the mobile computer device.

* * * * *